(12) United States Patent
Park et al.

(10) Patent No.: US 9,499,760 B2
(45) Date of Patent: Nov. 22, 2016

(54) COMPRESSOR AND AIR CONDITIONING APPARATUS USING THE SAME

(71) Applicant: SAMSUNG ELECTRONICS CO., LTD., Suwon-si, Gyeonggi-do (KR)

(72) Inventors: Soo Dol Park, Suwon-si (KR); Ki Hoon Nam, Goyang-si (KR); Jeong Bae Lee, Hwaseong-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 127 days.

(21) Appl. No.: 14/282,233

(22) Filed: May 20, 2014

(65) Prior Publication Data

US 2015/0020539 A1 Jan. 22, 2015

(30) Foreign Application Priority Data

Jul. 16, 2013 (KR) .......................... 10-2013-0083449

(51) Int. Cl.

| | |
|---|---|
| *F25B 31/00* | (2006.01) |
| *C10M 125/02* | (2006.01) |
| *F25B 1/04* | (2006.01) |
| *F25B 49/02* | (2006.01) |
| *F04C 23/00* | (2006.01) |
| *C09K 5/04* | (2006.01) |
| *F04C 18/356* | (2006.01) |
| *C10M 171/00* | (2006.01) |
| *F25B 13/00* | (2006.01) |

(52) U.S. Cl.
CPC ............ *C10M 125/02* (2013.01); *C09K 5/045* (2013.01); *F04C 18/3564* (2013.01); *F04C 23/001* (2013.01); *F04C 23/008* (2013.01); *F25B 1/04* (2013.01); *F25B 31/002* (2013.01); *F25B 49/022* (2013.01); *C10M 171/008* (2013.01); *C10M 2201/041* (2013.01); *C10N 2220/082* (2013.01); *C10N 2220/302* (2013.01); *C10N 2240/30* (2013.01); *F04C 2210/26* (2013.01); *F25B 13/00* (2013.01); *F25B 2313/0293* (2013.01); *F25B 2313/0294* (2013.01); *F25B 2400/12* (2013.01); *F25B 2500/06* (2013.01); *F25B 2500/16* (2013.01); *F25B 2600/027* (2013.01); *F25B 2700/21152* (2013.01)

(58) Field of Classification Search
CPC ...... C10M 125/02; C09K 5/045; F25B 1/00; F25B 31/002

USPC .................. 62/498; 252/68; 508/113
See application file for complete search history.

(56) References Cited

U.S. PATENT DOCUMENTS

| | | | | |
|---|---|---|---|---|
| 6,427,479 | B1 * | 8/2002 | Komatsubara | C09K 5/041 62/503 |
| 2007/0108403 | A1 * | 5/2007 | Sievert | C09K 5/045 252/67 |
| 2012/0174618 | A1 * | 7/2012 | Ogata | F04C 18/3564 62/498 |
| 2016/0032164 | A1 * | 2/2016 | Nappa | C09K 5/045 62/77 |

FOREIGN PATENT DOCUMENTS

| | | |
|---|---|---|
| JP | 2007-262298 | 10/2007 |
| KR | 1997-0075379 | 12/1997 |
| KR | 1998-042789 | 8/1998 |
| KR | 10-2005-0051869 | 6/2005 |

OTHER PUBLICATIONS

Korean Notice of Allowance issued Apr. 23, 2015 in corresponding Korean Patent Application No. 10-2013-0083449.
Korean Office Action issued Oct. 13, 2014 in corresponding Korean Patent Application No. 10-2013-0083449.
International Search Report issued Oct. 13, 2014 in corresponding International Application No. PCT/KR2014/006290.
Australian Notice of Acceptance dated Aug. 24, 2016 from Australian Patent Application No. 2014291086, 2 pages.

\* cited by examiner

*Primary Examiner* — Douglas McGinty
(74) *Attorney, Agent, or Firm* — Staas & Halsey LLP

(57) ABSTRACT

An air conditioning apparatus including a compressor, an outdoor heat exchanger, an indoor heat exchanger, and an expansion valve to depressurize a refrigerant. The refrigerant is formed of hydro fluorocarbon (HFC). The compressor includes a compression unit to compress the refrigerant, a motor unit to provide rotational power to the compression unit, and an oil accommodation portion to store oil to reduce friction between the rotating shaft and the compression unit and lower a temperature of the compressor, and the oil contains a carbon nanoparticle. Even when an HFC-based refrigerant producing high discharge temperature in a compressor is used, deterioration of the compressor due to the high temperature is prevented. In addition, by lowering the operational temperature of the compressor, the reliability and performance of the compressor using the HFC-based refrigerant and the air conditioning apparatus using the same may be enhanced.

29 Claims, 15 Drawing Sheets

CONFIGURATION OF (METHANE-BASED) HALOCARBON

FIG. 13

| THERMAL CLASS | JEC 2200 | ANSI C57.12.80 | IEC 80 /BS 2757 | MAIN MATERIAL | ADHESIVE MATERIAL COATING MATERIAL |
|---|---|---|---|---|---|
| CLASS A | 105 | 105 | 105 | COTTON, PAPER, POLYETHYLENE, POLYVINYL CHLORIDE, NATURAL RUBBER | INSULATING OIL, NATURAL VARNISH |
| CLASS E | 120 | – | 120 | SYNTHETIC RESINS SUCH AS POLYSTYRENE, EPOXY RESIN, MELAMINE RESIN, PHENOL RESIN, AND POLYURETHANE | NONE |
| CLASS B | 130 | 150 | 130 | INORGANIC MATERIALS SUCH AS MICA, ASBESTOS, AND GLASS FIBER | COMMON ADHESIVE |
| CLASS F | 155 | 185 | 155 | | SILICONE ALKYD RESIN |
| CLASS H | 180 | 220 | 180 | | SILICONE RESIN |

FIG. 15
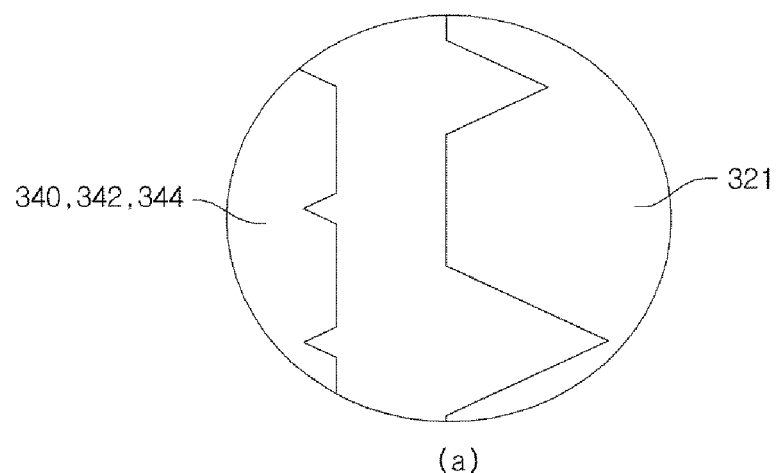
(a)
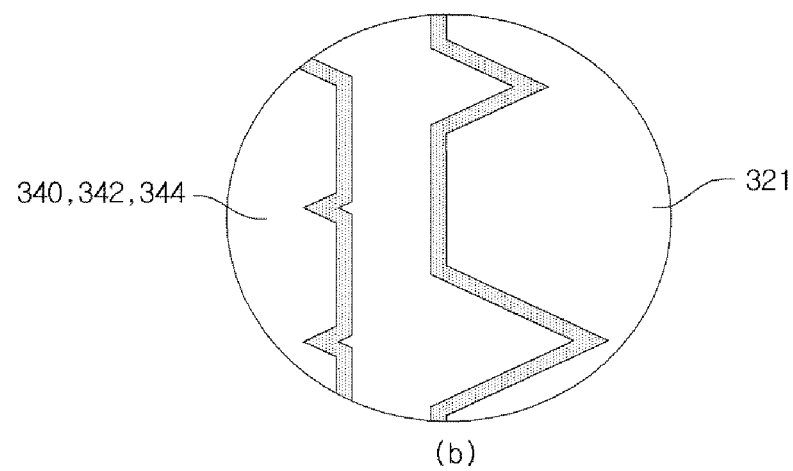
(b)
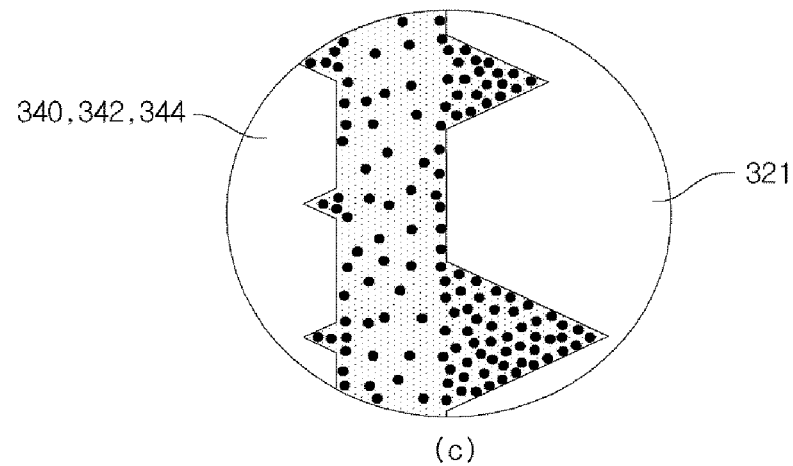
(c)

COMPRESSOR AND AIR CONDITIONING APPARATUS USING THE SAME

CROSS-REFERENCE TO RELATED APPLICATIONS

This application claims the benefit of Korean Patent Application No. 10-2013-0083449, filed on Jul. 16, 2013 in the Korean Intellectual Property Office, the disclosure of which is incorporated herein by reference.

BACKGROUND

1. Field

Embodiments of the present disclosure relate to a compressor using R32 refrigerant and an air conditioning apparatus using the same.

2. Description of the Related Art

An air conditioning apparatus includes an outdoor unit in which heat exchange occurs between the outdoor air and a refrigerant and an indoor unit in which heat exchange occurs between the indoor air and the refrigerant. The air conditioning apparatus is an apparatus that discharges thermal energy contained in indoor air to the outside through a refrigerant or absorbs thermal energy from outdoor air through the refrigerant and discharges the same to the indoor space.

A conventional air conditioning apparatus uses a chlorofluorocarbon (CFC)-based refrigerant, which is commonly known as Freon, as the refrigerant to transfer thermal energy from the indoor space to the outdoor space or vice versa.

Since CFCs have been blamed for playing a major role in destruction of the ozone layer, use of CFC-based refrigerants has come under strict control worldwide. Instead, hydrochlorofluorocarbon (HCFC)-based refrigerants have been used as an alternative.

Recently, global warming potential (GWP) has formed the basis of refrigerant regulations in place of ozone depletion potential (ODP). Since HCFC-based refrigerants have been identified as a major cause of global warming, hydro fluorocarbon (HFC)-based refrigerants are receiving attention as an alternative.

However, when an HFC-based refrigerant is used in a compressor, discharge temperature may be 20° C. to 25° C. higher than when an HCFC-based refrigerant is used. Due to such high temperature, components of the compressor may be deteriorated, thereby lowering reliability and performance of the compressor.

SUMMARY

Therefore, it is an aspect of the present disclosure to provide a compressor whose reliability and performance may be maintained even when a hydro fluorocarbon (HFC)-based refrigerant is used, and an air conditioning apparatus using the same.

Additional aspects of the disclosure will be set forth in part in the description which follows and, in part, will be apparent from the description, or may be learned by practice of the disclosure.

In accordance with one aspect of the present disclosure, an air conditioning apparatus includes a compressor to compress a refrigerant, an outdoor heat exchanger to perform heat exchange between outdoor air and the refrigerant, an indoor heat exchanger to perform heat exchange between indoor air and the refrigerant, and an expansion valve to depressurize the refrigerant, wherein the refrigerant is formed of hydro fluorocarbon (HFC), the compressor includes a compression unit to compress the refrigerant, a motor unit to provide rotational power to the compression unit through a rotating shaft connected to the compression unit, and an oil accommodation portion to store oil to reduce friction between the rotating shaft and the compression unit and lower a temperature of the compressor, and the oil contains a carbon nanoparticle.

The refrigerant may include methylene fluoride, the percentage of the methylene fluoride being at least 40%.

The refrigerant may further include at least one of penta-fluoro ethane and tetra-fluoro ethane.

A mass fraction of the carbon nanoparticle contained in the oil may be about 0.01% to about 0.3% of a mass of the oil.

A size of the carbon nanoparticle contained in the oil may be between about 3 nanometers and 10 nanometers.

The carbon nanoparticle may include a fullerene formed in a spherical or ellipsoidal shape.

The fullerene may include C60 provided with a spherical shape by covalent bonding of sixty carbon atoms.

A volume of the oil may be about 35% to about 45% of an effective volume of an interior of the compressor, wherein the effective volume represents a volume obtained by subtracting volumes of the motor unit and the compressor unit from an entire volume of the compressor.

A temperature of the refrigerant discharged from the compressor may be 8° C. lower than a temperature of the refrigerant discharged from the compression unit.

The motor unit may include a stator fixed to an interior of the compressor, and a rotator connected to the rotating shaft and rotatably arranged in the stator, wherein the stator may include a coil to produce a rotating magnetic field, and a coil fixing member to fix the coil.

An insulation member to insulate the coil may be formed of a material from thermal class E allowing temperature up to 155° C.

The insulation member may be a silicone alkyd resin or a silicone resin.

The coil fixing member may be formed of an insulative material having a Resistible Temperature of 140° C.

The coil fixing member may be formed of at least one of mica, asbestos, and glass fiber.

The compressor may further include a refrigerant accommodation portion to store the refrigerant discharged from the compression unit.

The compression unit may include a cylinder to define a compression space to compress the refrigerant, a rolling piston connected to the rotating shaft to eccentrically rotate in the cylinder, and a vane protruding from an inner circumferential surface of the cylinder toward the rotating shaft to divide the compression space into a compression chamber for compression of the refrigerant and a suction chamber for suction of the refrigerant.

The rolling piston may compress the refrigerant in the compression chamber by eccentrically rotating with respect to the rotating shaft.

The compression unit may discharge the refrigerant in the compression chamber to the refrigerant accommodation portion when a pressure of the refrigerant in the compression chamber is equal to or greater than a predetermined pressure.

The compression unit may further include a plurality of bearing plates to fix the rotating shaft and to cover upper and lower portions of the cylinder to seal the compression space.

In accordance with another aspect of the present disclosure, a compressor includes a compression unit to compress a refrigerant, a motor unit to provide rotational power to the compression unit through a rotating shaft connected to the compression unit, and an oil accommodation portion to store oil to reduce friction between the rotating shaft and the compression unit and lower a temperature of the compressor, wherein the compression unit includes a cylinder to define a compression space to compress the refrigerant, a rolling piston connected to the rotating shaft to eccentrically rotate in the cylinder, and a vane protruding from an inner circumferential surface of the cylinder toward the rotating shaft to divide the compression space into a compression chamber for compression of the refrigerant and a suction chamber for suction of the refrigerant, the refrigerant is formed of hydro fluorocarbon (HFC), and the oil contains a carbon nanoparticle.

In addition, the refrigerant may include methylene fluoride, the percentage of the methylene fluoride being at least 40%.

The refrigerant may further include at least one of pentafluoro ethane and tetra-fluoro ethane.

A mass fraction of the carbon nanoparticle contained in the oil to may be about 0.01% to about 0.3% of a mass of the oil.

A size of the carbon nanoparticle contained in the oil may be between about 3 nanometers and 10 nanometers.

The carbon nanoparticle may include a fullerene formed in a spherical or ellipsoidal shape.

The fullerene may include C60 provided with a spherical shape by covalent bonding of sixty carbon atoms.

A volume of the oil may be about 35% to about 45% of an effective volume of an interior of the compressor, wherein the effective volume represents a volume obtained by subtracting volumes of the motor unit and the compressor unit from an entire volume of the compressor.

A temperature of the refrigerant discharged from the compressor may be 8° C. lower than a temperature of the refrigerant discharged from the compression unit.

The motor unit may include a stator fixed to an interior of the compressor, and a rotator connected to the rotating shaft and rotatably arranged in the stator, wherein the stator may include a coil to produce a rotating magnetic field, and a coil fixing member to fix the coil.

An insulation member to insulate the coil may be formed of a material from thermal class E allowing temperature up to 155° C.

The insulation member may be a silicone alkyd resin or a silicone resin.

The coil fixing member may be formed of an insulative material having a Resistible Temperature of 140° C.

The coil fixing member may be formed of at least one of mica, asbestos, and glass fiber.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 13 is a view illustrating representative substances of respective thermal classes;

FIG. 15 is an enlarged view showing region B of FIG. 5.

DETAILED DESCRIPTION

Figure 1:
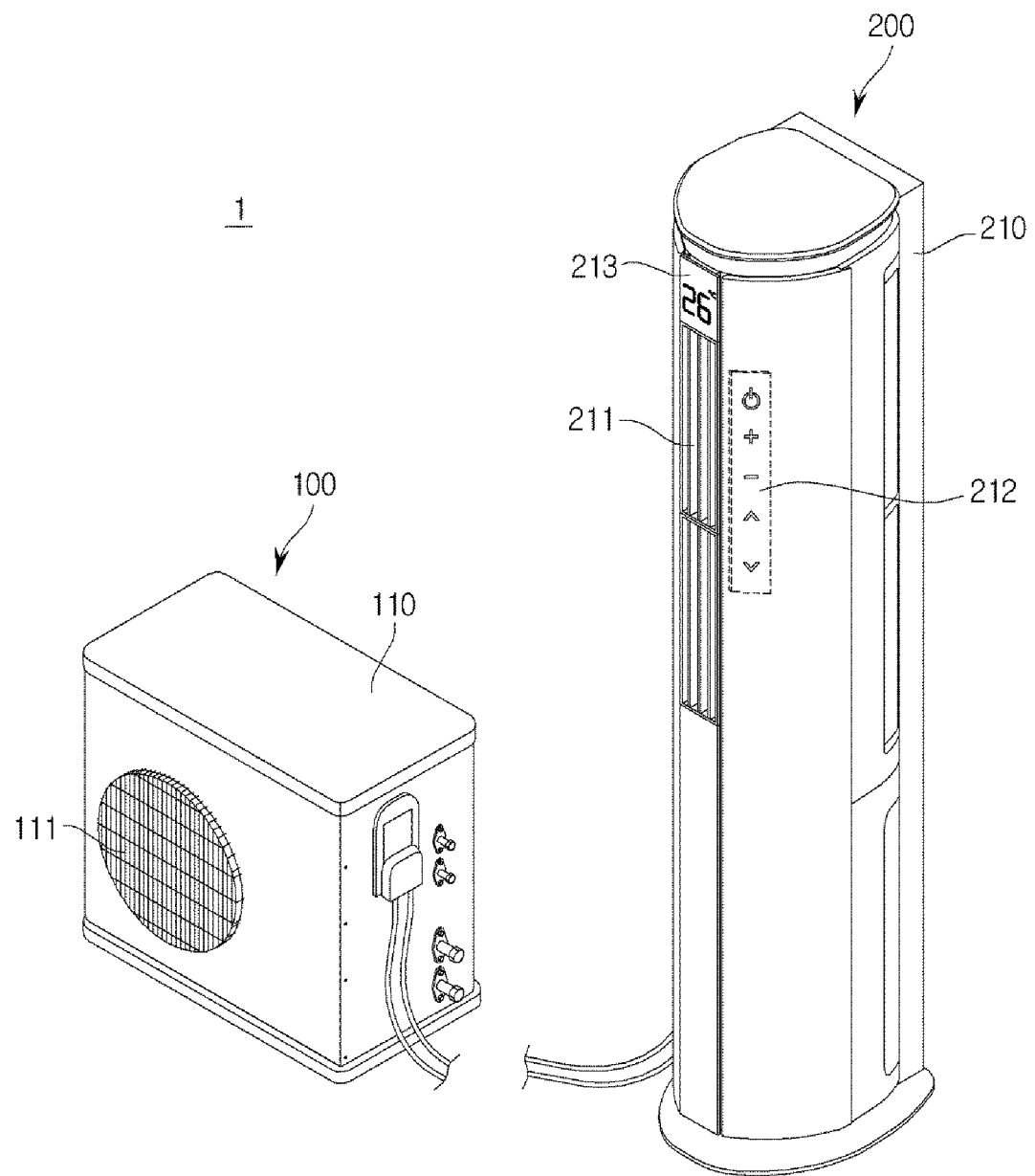
FIG. 1 is a view illustrating the external appearance of an air conditioning apparatus according to an embodiment.

It should be understood that embodiments disclosed in this specification and constituents shown in the accompanying drawings are simply illustrative and there are many variations which may replace the embodiments and drawings of this specification at the time of filing of this application.

Reference will now be made in detail to the embodiments of the present disclosure, examples of which are illustrated in the accompanying drawings, wherein like reference numerals refer to like elements throughout.

FIG. 1 is a view illustrating the external appearance of an air conditioning apparatus according to an embodiment.

Referring to FIG. 1, an air conditioning apparatus 1 includes an outdoor unit 100 provided in an outdoor space to perform heat exchange between outdoor air and a refrigerant, and an indoor unit 200 provided in an indoor space to perform heat exchange between indoor air and the refrigerant.

The outdoor unit 100 includes an outdoor unit body 110 forming the external appearance of the outdoor unit 100, and an outdoor unit discharge port 111 provided at one side of the outdoor unit body 110 to discharge air having undergone heat exchange.

The indoor unit 200 includes an indoor unit body 210 forming the external appearance of the indoor unit 200, an indoor unit discharge port 211 provided at a front surface of the indoor unit body 210 to discharge air having undergone heat exchange, a control panel 212 through which an operational command for the air conditioning apparatus 1 is received from a user, and a display panel 213 to display operational information about the air conditioning apparatus 1.

Hereinafter, the flow of the refrigerant and the flow of signals in the air conditioning apparatus will be respectively described. A description of the flow of the refrigerant in the air conditioning apparatus will be followed by a description of the flow of signals in the air conditioning apparatus.

Figure 2:
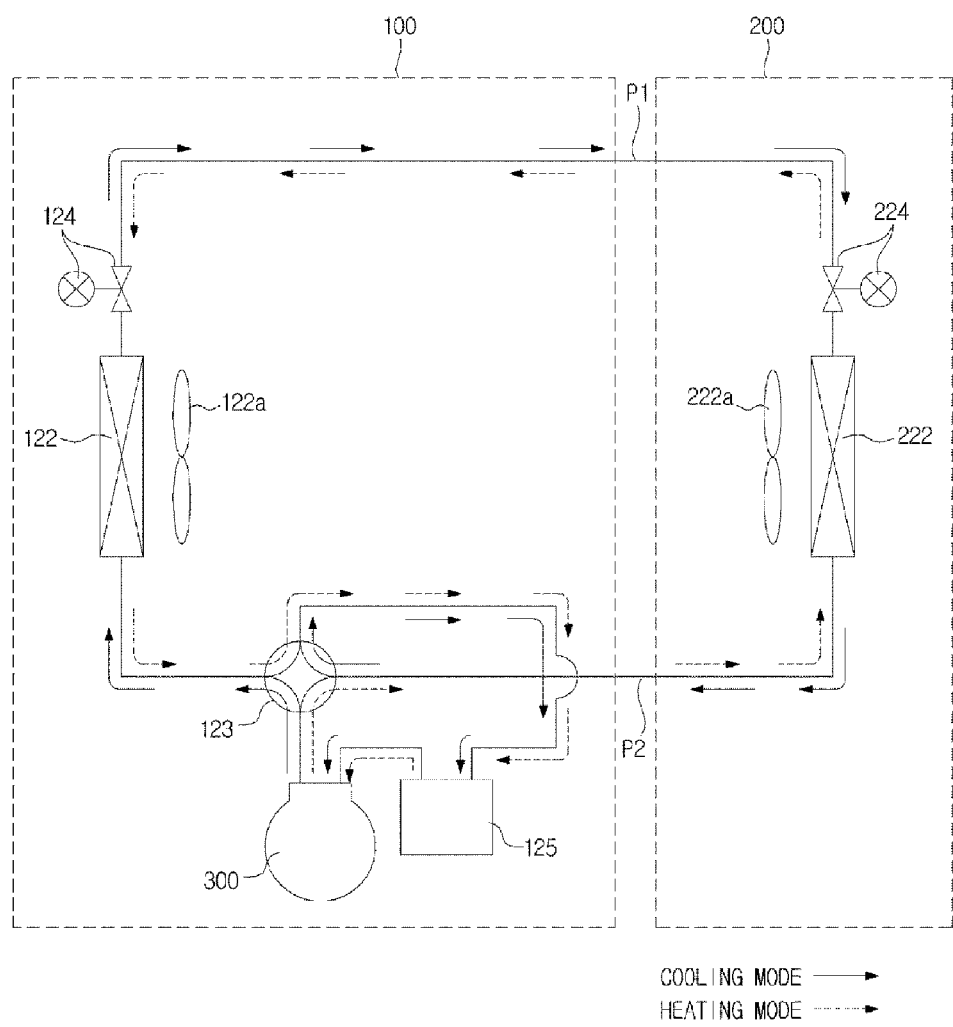
FIG. 2 is a view illustrating constituents involved in the flow of a refrigerant in the air conditioning apparatus according to one embodiment.

FIG. 2 is a view illustrating constituents involved in the flow of a refrigerant in the air conditioning apparatus according to one embodiment.

Referring to FIG. 2, the air conditioning apparatus 1 includes an outdoor unit 100, an indoor unit 200, and a gas pipe P1 connecting the outdoor unit 100 to the indoor unit 200 and functioning as a path through which a gaseous refrigerant flows, and a liquid pipe P2 functioning as a path through which a liquid refrigerant flows. The gas pipe P1 and the liquid pipe P2 extend into the outdoor unit 100 and indoor unit 200.

The outdoor unit 100 includes a compressor 300 to compress a refrigerant, an outdoor heat exchanger 122 to perform heat exchange between outdoor air and the refrigerant, a four-way valve 123 to selectively guide the refrigerant compressed in the compressor 300 to one of the outdoor heat exchanger 122 and the indoor unit 200 according to a heating mode or a cooling mode, an outdoor expansion valve 124 to depressurize the refrigerant guided to the outdoor heat exchanger 122 in the heating mode, and an accumulator 125 to prevent the liquid refrigerant having failed to evaporate from flowing into the compressor 300.

The compressor 300 compresses the gaseous refrigerant at a low pressure to a high pressure using the rotational power of a compressor motor (not shown) which rotates by receiving electrical energy from an external power source. A detailed description of the compressor 300 will be given below.

In the cooling mode, the four-way valve 123 guides the refrigerant compressed in the compressor 300 to the outdoor heat exchanger 122. In the heating operation, the four-way valve 123 guides the refrigerant compressed in the compressor 300 to the indoor unit 200.

The outdoor heat exchanger 122 condenses the refrigerant, compressed in the compressor 300, in the cooling mode, and evaporates the refrigerant, depressurized in the indoor unit 200, in the heating mode. The outdoor heat exchanger 122 may include an outdoor heat exchanger refrigerant pipe (not shown) through which the refrigerant passes, an outdoor heat exchanger cooling fin (not shown) to increase the surface area of contact between the outdoor heat exchanger refrigerant pipe (not shown) and outdoor air to improve the efficiency of heat exchange between the refrigerant and the outdoor air, and a cooling fan 122a to blow the outdoor air to the outdoor heat exchanger.

In the heating mode, the outdoor expansion valve 124 may not only depressurize the refrigerant, but also regulate the amount of the refrigerant supplied to the outdoor heat exchanger 122 to allow sufficient heat exchange in the outdoor heat exchanger 122. Specifically, the outdoor expansion valve 124 depressurizes the refrigerant using a throttling effect of the refrigerant, which refers to depressurization of the refrigerant occurring without heat exchange with any external element when the refrigerant passes through a narrow flow path. The outdoor expansion valve 124 may employ an electronic valve whose opening degree is adjustable to regulate the amount of the refrigerant passing through the outdoor expansion valve 124.

The indoor unit 200 includes an indoor heat exchanger 222 to perform heat exchange between indoor air and the refrigerant, and an indoor expansion valve 224 to depressurize the refrigerant supplied to the indoor heat exchanger 222 in the cooling mode.

The indoor heat exchanger 222 evaporates the low-pressure liquid refrigerant in the cooling mode, and condenses the high-pressure gaseous refrigerant in the heating mode. Similar to the outdoor heat exchanger 122 of the outdoor unit 100, the indoor heat exchanger 222 may include an indoor heat exchanger refrigerant pipe (not shown) through which the refrigerant passes, an indoor heat exchanger cooling fin (not shown) to improve the efficiency of heat exchange between the refrigerant and the indoor air, and a cooling fan 222a to blow the indoor air having exchanged heat with the refrigerant in the indoor heat exchanger 222 to the indoor space.

The indoor expansion valve 224 may not only depressurize the refrigerant using a throttling effect, but also regulate the amount of refrigerant supplied to the outdoor heat exchanger 122 to allow sufficient heat exchange in the indoor heat exchanger 222. The indoor expansion valve 224 may employ an electronic valve which is capable of adjusting an opening degree to regulate the amount of the refrigerant passing through the indoor expansion valve 224.

Hereinafter, flow of the refrigerant according to the operational modes of the air conditioning apparatus 1, i.e., the cooling mode and the heating mode will be described.

When the air conditioning apparatus 1 operates in the cooling mode, the refrigerant is compressed to high pressure by the compressor 300 of the outdoor unit 100. When the refrigerant is compressed, the pressure and temperature of the refrigerant simultaneously increase.

The compressed refrigerant is guided to the outdoor heat exchanger 122 by the four-way valve 123. The refrigerant guided to the outdoor heat exchanger 122 condenses in the outdoor heat exchanger 122. During condensation of the refrigerant, heat exchange occurs between the refrigerant and the outdoor air. Specifically, when the phase of the refrigerant changes from gas to liquid, the refrigerant releases energy corresponding to the difference between the internal energy of the gaseous refrigerant and the internal energy of the liquid refrigerant (latent heat) to the outdoor space.

After passing through the outdoor expansion valve 124, the condensed liquid refrigerant is supplied to the indoor unit 200 via the liquid pipe P2.

The liquid refrigerant supplied to the indoor unit 200 is depressurized in the indoor expansion valve 224 provided in the liquid pipe P2, while the temperature thereof decreases. Specifically, the indoor expansion valve 224 depressurizes the refrigerant using a throttling effect of the refrigerant, which refers to depressurization of the refrigerant occurring without heat exchange with any external element when the fluid passes through a narrow flow path.

The indoor expansion valve 224 may employ an electronic valve which is capable of adjusting an opening degree to regulate the amount of the refrigerant introduced into the indoor heat exchanger 222, which will be described later.

The depressurized liquid refrigerant evaporates in the indoor heat exchanger 222. During evaporation of the refrigerant, heat exchange occurs between the refrigerant and the indoor air. Specifically, when the phase of the refrigerant changes from liquid to gas, the refrigerant absorbs energy corresponding to the difference between the internal energy of the gaseous refrigerant and the internal energy of the liquid refrigerant (latent heat) from the indoor air. In the cooling mode, the air conditioning apparatus 1 may cool the indoor air through heat exchange between the refrigerant and the indoor air occurring in the indoor heat exchanger 222, i.e., through absorption of latent heat from the indoor air by the refrigerant.

The evaporated gaseous refrigerant is supplied to the outdoor unit 100 via the gas pipe P1, and then supplied to the accumulator 125 via the four-way valve 123. In the accumulator 125, the liquid refrigerant not having evaporated is separated from the evaporated gaseous refrigerant, and the gaseous refrigerant is supplied back to the compressor 300.

As the gaseous refrigerant supplied to the compressor 300 is compressed by the compressor 300, circulation of the refrigerant is repeated as above.

In summary, during heat exchange by the refrigerant in the air conditioning apparatus 1 operating in the cooling mode, the refrigerant absorbs thermal energy from the indoor air in the indoor heat exchanger 222 of the indoor unit 200, and releases the thermal energy to the outdoor space in the outdoor heat exchanger 122 of the outdoor unit 100, thereby transferring the thermal energy of the indoor space to the outdoor space.

When the air conditioning apparatus 1 operates in the heating mode, the refrigerant is compressed to high pressure by the compressor 300 of the outdoor unit 100. Thereby, the pressure and temperature of the refrigerant simultaneously increase.

After passing through the four-way valve 123, the compressed refrigerant is guided to the indoor unit 200 along the gas pipe P1.

The refrigerant condenses in the indoor heat exchanger 222. During condensation of the refrigerant, heat exchange occurs between the refrigerant and the indoor air. Specifically, when the phase of the refrigerant changes from gas to liquid, the refrigerant releases energy corresponding to the difference between the internal energy of the gaseous refrigerant and the internal energy of the liquid refrigerant (latent heat) to the outdoor space. In the heating mode, the air conditioning apparatus 1 may heat the indoor air through heat exchange between the refrigerant and the indoor air occurring in the indoor heat exchanger 222, i.e., through release of latent heat from the refrigerant.

After passing through the expansion valve 224, the condensed liquid refrigerant is supplied to the outdoor unit 100 along the liquid pipe P2.

The liquid refrigerant supplied to the outdoor unit 100 is depressurized in the outdoor expansion valve 124 provided in the liquid pipe P2, while the temperature thereof decreases. The outdoor expansion valve 124 as above may employ an electronic valve whose opening degree is adjustable to regulate the amount of the refrigerant introduced into the outdoor heat exchanger 122, as will be described later.

The depressurized liquid refrigerant evaporates in the outdoor heat exchanger 122. During evaporation of the refrigerant, heat exchange occurs between the refrigerant and the outdoor air. Specifically, when the phase of the refrigerant changes from liquid to gas, the refrigerant absorbs energy corresponding to the difference between the internal energy of the gaseous refrigerant and the internal energy of the liquid refrigerant (latent heat) from the outdoor air.

The gaseous refrigerant evaporated in the outdoor heat exchanger 122 is supplied to the accumulator 125 via the four-way valve 123. In the accumulator 125, the liquid refrigerant not having evaporated is separated from the evaporated gaseous refrigerant, and the gaseous refrigerant is supplied back to the compressor 300.

As the gaseous refrigerant supplied to the compressor 300 is compressed by the compressor 300, circulation of the refrigerant is repeated.

In summary, during heat exchange by the refrigerant in the air conditioning apparatus 1 operating in the heating mode, the refrigerant absorbs thermal energy from the outdoor air in the outdoor heat exchanger 122 of the outdoor unit 100, and releases the thermal energy to the outdoor space in the indoor heat exchanger 222 of the indoor unit 200, thereby transferring the thermal energy of the outdoor space to the indoor space.

Flow of the refrigerant among the constituents included in the air conditioning apparatus has been described above. Hereinafter, flow of signals among the constituents included in the air conditioning apparatus will be described.

Figure 3:
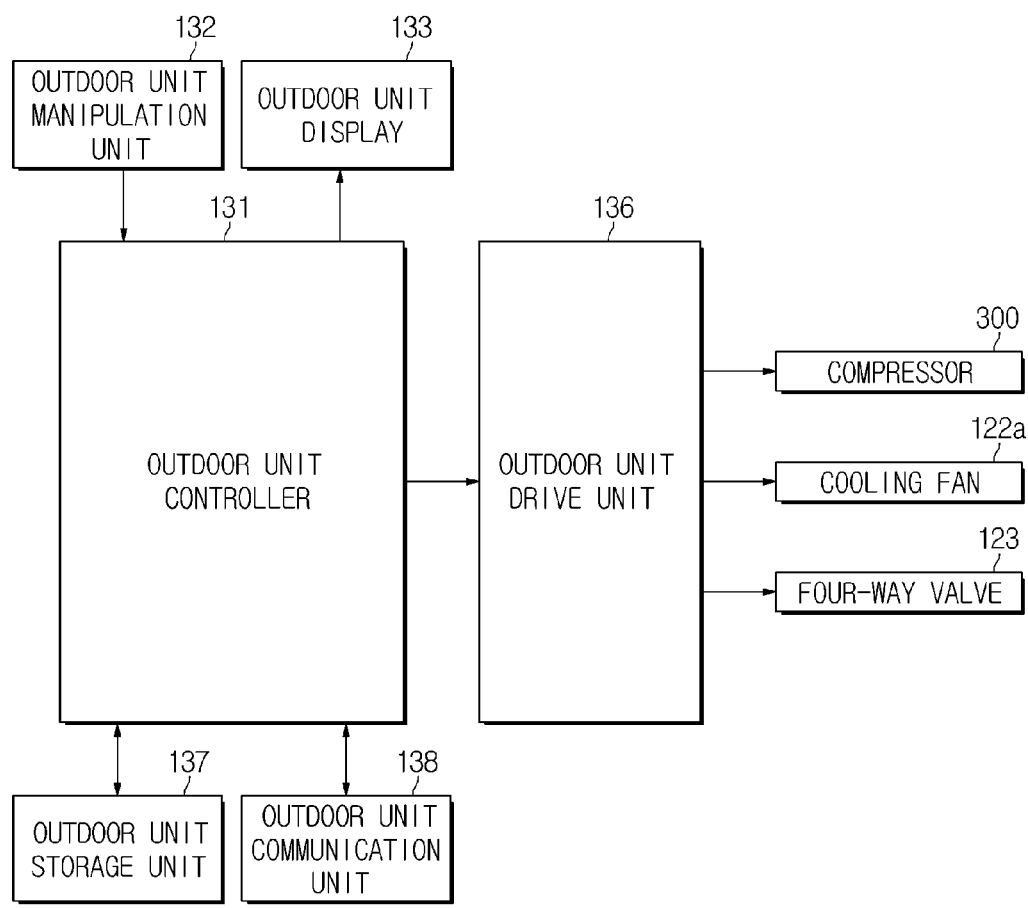
FIG. 3 is a block diagram illustrating flow of control signals in an outdoor unit included in an air conditioning apparatus according to one embodiment.

FIG. 3 is a block diagram illustrating flow of control signals in an outdoor unit included in an air conditioning apparatus according to one embodiment.

Referring to FIG. 3, the outdoor unit 100 includes an outdoor unit manipulation unit 132 allowing a user to input an operational command to the outdoor unit 100 therethrough, an outdoor unit display 133 to display operational information about the outdoor unit 100, a compressor 300 included in the outdoor unit 100, an outdoor unit drive unit 136 to generate drive current to drive a cooling fan 122a and a four-way valve 123, an outdoor unit storage unit 137 to store programs and data related to operation of the outdoor unit 100, an outdoor unit communication unit 138 to communicate with the indoor unit 200, and an outdoor unit controller 131 to control respective constituents included in the outdoor unit 100.

Figure 4:
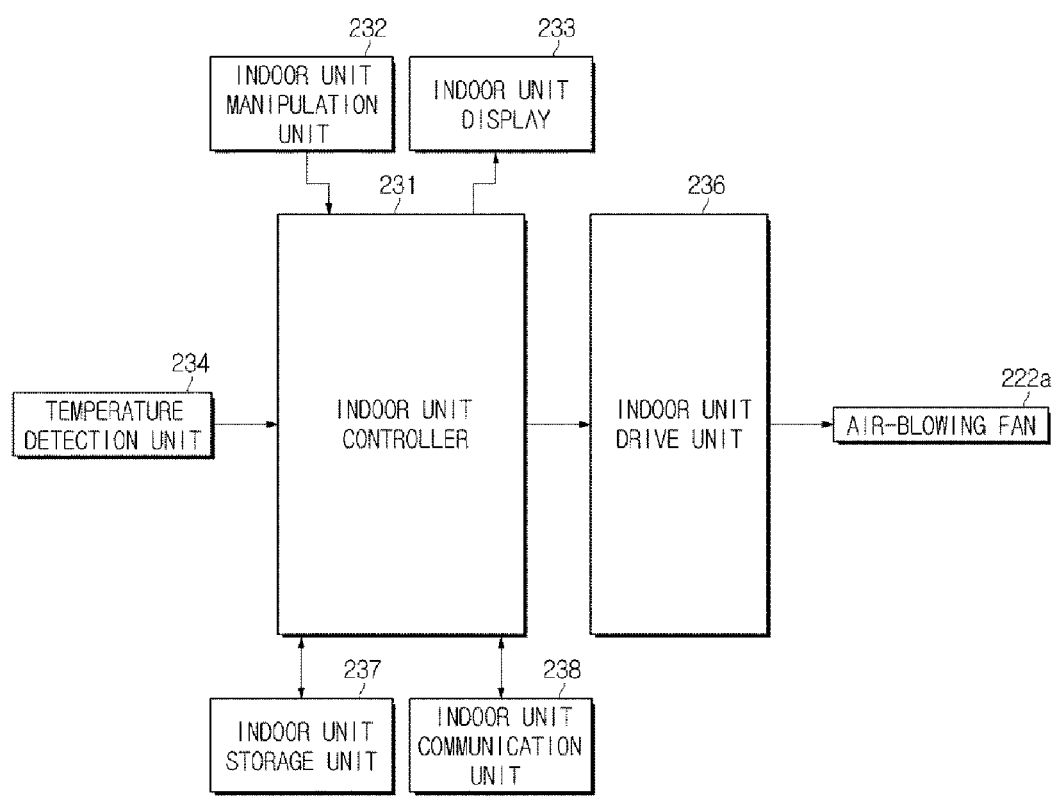
FIG. 4 is a block diagram illustrating flow of control signals in an indoor unit included in an air conditioning apparatus according to one embodiment.

FIG. 4 is a block diagram illustrating flow of control signals in an indoor unit included in an air conditioning apparatus according to one embodiment.

Referring to FIG. 4, the indoor unit 200 includes an indoor unit manipulation unit 232 allowing a user to input an operational command for the indoor unit 200 therethrough, an indoor unit display 233 to display operational information about the indoor unit 200, a temperature detection unit 234 to detect the temperature of an indoor space where the indoor unit 200 is located, an indoor unit drive unit 236 to drive an air-blowing fan 222a of the indoor unit 200, an indoor unit storage unit 237 to store programs and data related to operation of the indoor unit 200, an indoor unit communication unit 238 to communicate with the outdoor unit 100, and an indoor unit controller 231 to control respective constituents included in the indoor unit 200.

A description of constituents of the air conditioning apparatus has been given above. Hereinafter, the compressor included in the air conditioning apparatus will be described.

Figure 5:
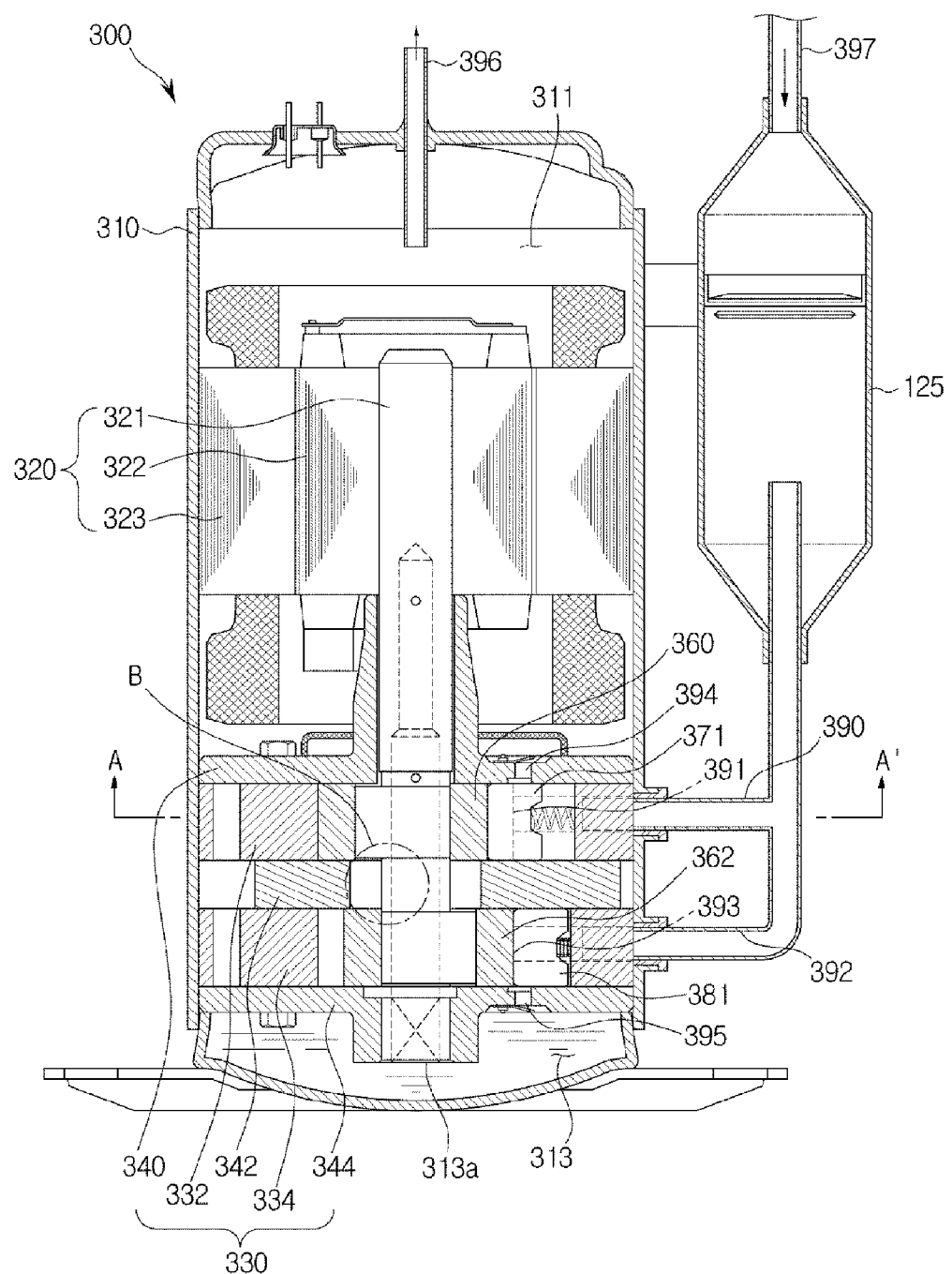
FIG. 5 is a lateral cross-sectional view illustrating a compressor and an accumulator included in an air conditioning apparatus according to one embodiment.

FIG. 5 is a lateral cross-sectional view illustrating a compressor and an accumulator included in an air conditioning apparatus according to one embodiment.

Referring to FIG. 5, the compressor 300 may be provided with a casing 310 arranged adjacent to the accumulator 125 having an inlet 397 and forming an external appearance of the compressor 300, and a motor unit 320 installed at an inner upper portion of the casing 310, and a compression unit 330 installed at an inner lower portion of the casing 310 connected to the motor unit 320 through a rotating shaft 321 of the motor unit 320. In addition, provided in the casing 310 are a refrigerant accommodation portion 311 to accommodate the high-pressure gaseous refrigerant compressed in the compression unit 330, and a compressor oil accommodation portion 313 to accommodate compressor oil which allows smooth rotation of the motor unit 320 and lowers the temperature in the casing 310. In addition, a compressor oil introduction port 313a is provided at an upper portion of the compressor oil accommodation portion 313 to allow the compressor oil to be introduced into the compression unit 330.

Figure 6:
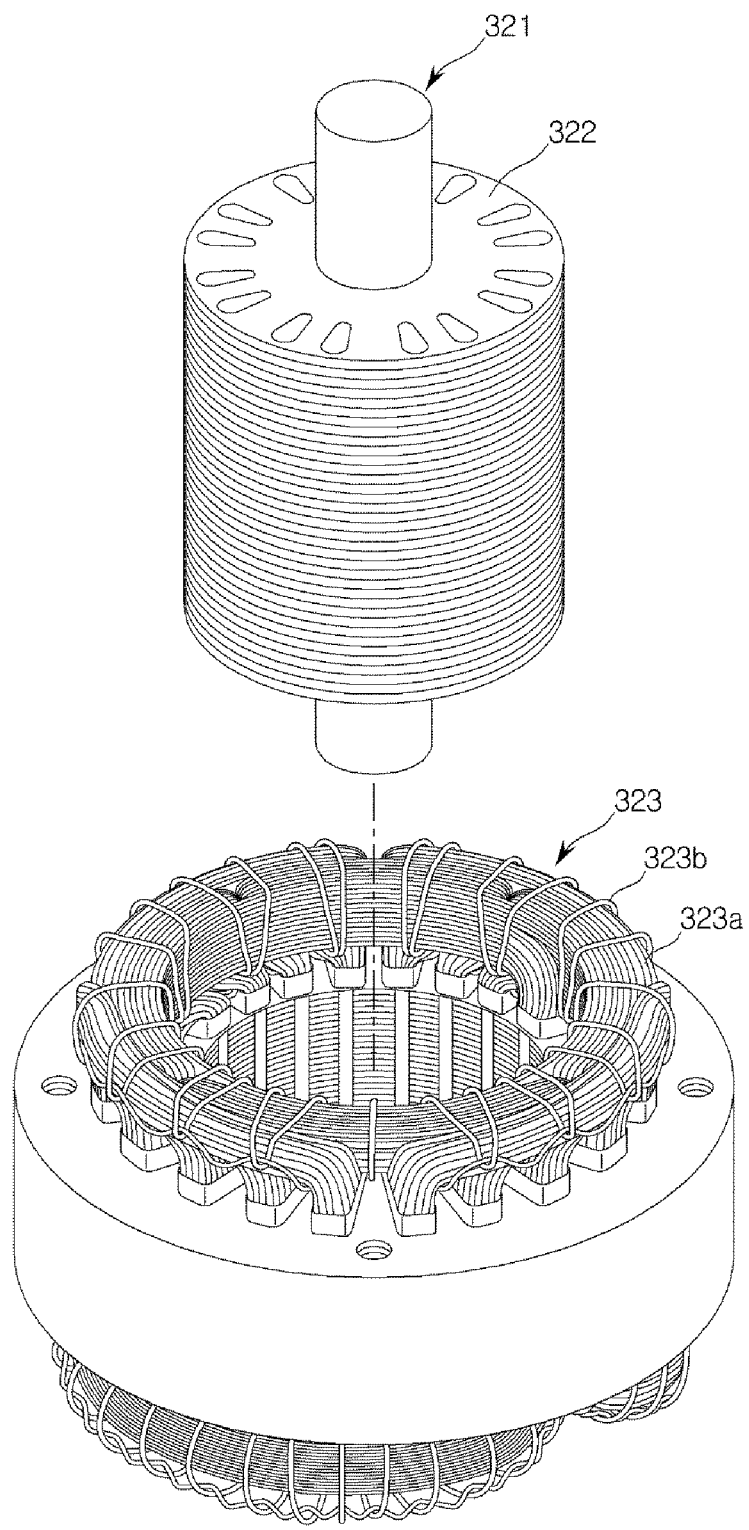
FIG. 6 is a perspective view illustrating a motor unit of a compressor included in an air conditioning apparatus according to one embodiment.

FIG. 6 is a perspective view illustrating a motor unit of a compressor included in an air conditioning apparatus according to one embodiment.

Referring to FIG. 6, the motor unit 320 includes a cylindrical stator 323 fixed to the inner surface of the casing 310, and a rotator 322 rotatably installed in the stator 323 and having a central portion coupled to the rotating shaft 321.

The stator 323 includes a plurality of coils 323a to generate a rotating magnetic field, and a coil fixing member 323b to fix the coils 323a.

The shape of the rotator 322 may vary depending upon the type of the motor unit 320. That is, in the case that the motor unit 320 is provided with a synchronous motor, the rotator 322 may include a plurality of permanent magnets (not shown) arranged along the outer circumferential surface of the rotating shaft 321. In the case that the motor unit 320 is provided with an induction motor, the rotator 322 may include a plurality of coils to induce a magnetic field.

The motor unit 320 may rotate the rotator 322 through interaction between a magnetic field produced by the stator 323 and a magnetic field produced by the rotator 322, thereby transferring rotation of the rotator 322 to the compression unit 330 through the rotating shaft 321 to drive the compression unit 330 through rotation.

Figure 7:
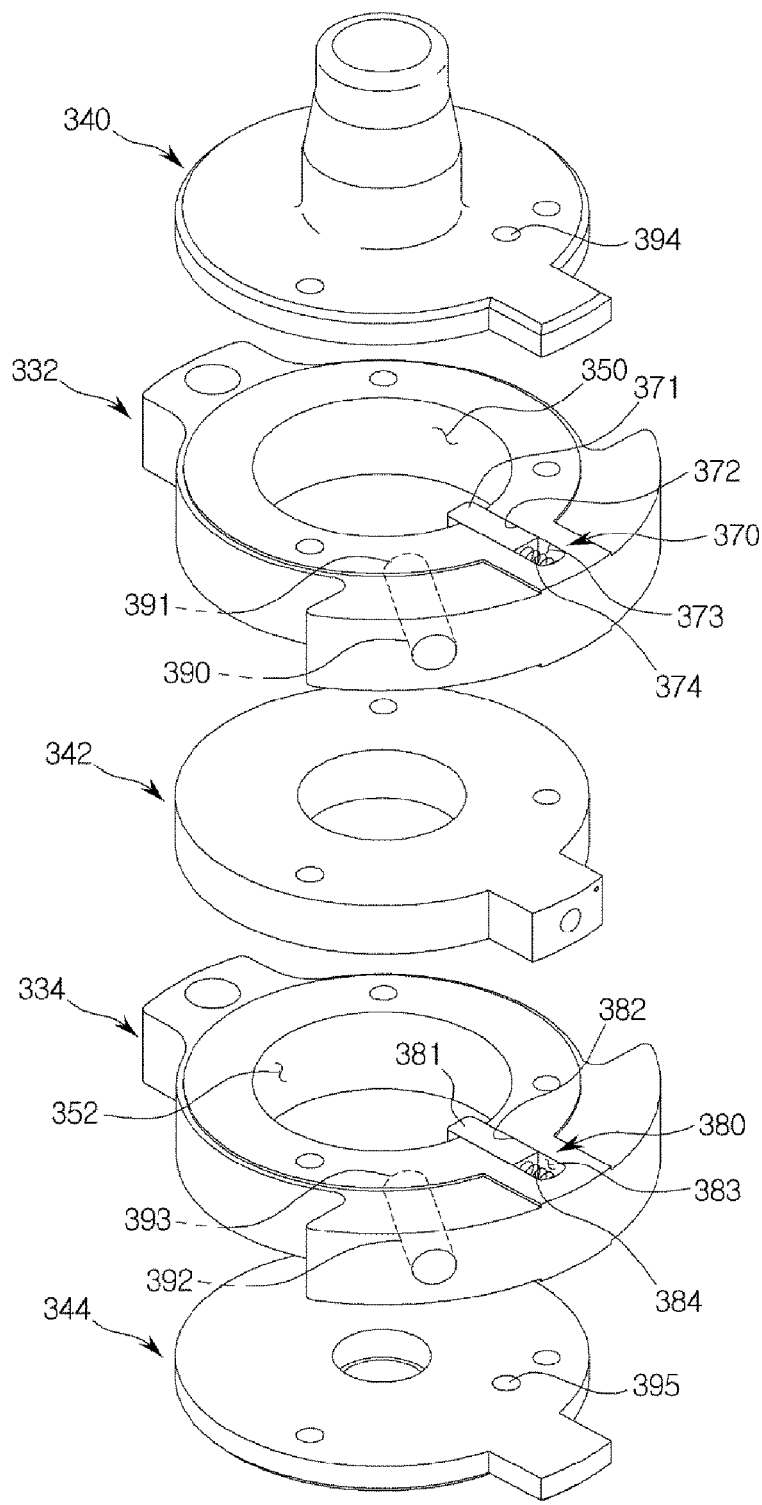
FIG. 7 is an exploded perspective view illustrating a compression unit of a compressor included in an air conditioning apparatus according to one embodiment.
Figure 8:
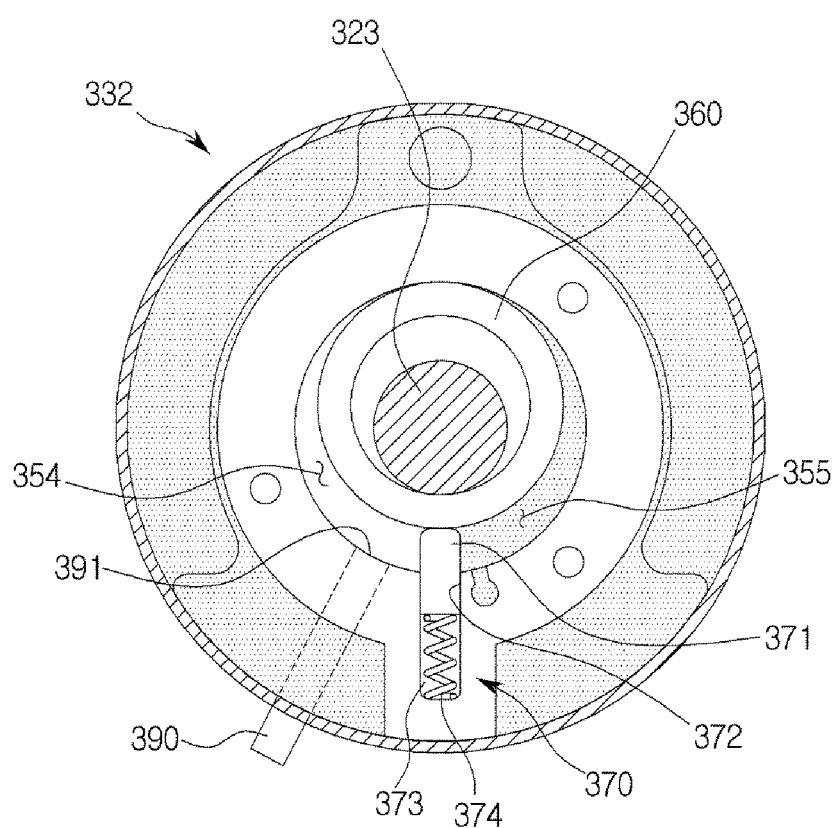
FIG. 8 shows a cross-sectional view taken along line A-A' of FIG. 5.

FIG. 7 is an exploded perspective view illustrating a compression unit of a compressor included in an air conditioning apparatus according to one embodiment, and FIG. 8 shows a cross-sectional view taken along line A-A' of FIG. 5.

Referring to FIGS. 7 and 8, the compression unit 330 may include a plurality of cylinders 332 and 334 arranged in the casing 310 and respectively provided with sectionalized compression spaces 350 and 352, and a plurality of bearing plates 340, 342 and 344 to cover the tops and bottoms of the cylinders 332 and 334 to define the compression spaces 350 and 352 in conjunction with the cylinders 332 and 334.

The cylinders 332 and 334 respectively include compression spaces 350 and 352 defined therein, rolling pistons 360 and 362 to rotate about different centers in the compression spaces 350 and 352, vanes 371 and 381 to respectively contact the outer circumferences of the rolling pistons 360 and 362 and divide each of the compression spaces 350 and 352 into a suction chamber 354 and a compression chamber 355, and vane chambers 370 and 380 formed recessed outward of the compression spaces 350 and 352 to allow the vanes 371 and 381 to move forward and backward.

The cylinders 332 and 334 may include a first cylinder 332 provided with the first compression space 350, and a second cylinder 334 disposed at the lower side of the first cylinder 332 and provided with the second compression space 352. While the compressor 300 is illustrated in FIGS. 7 and 8 as having two cylinders 332 and 334, embodiments of the present disclosure are not limited thereto. The compressor 300 may include one, three, or more cylinders.

The bearing plates 340, 342 and 344 cover the tops and bottoms of the cylinders 332 and 334 to define the compression spaces 350 and 352 in conjunction with the cylinders 332 and 334. The bearing plates 340, 342 and 344 may include a second bearing plate 342 provided between the first cylinder 332 and the second cylinder 334, a first bearing plate 340 provided at the upper side of the first cylinder 332 to close the upper opening of the first compression space 350, and a third bearing plate 344 provided at the lower side of the second cylinder 334 to close the lower opening of the second compression space 352. In addition, the bearing plates 340, 342 and 344 support the rotating shaft 321 of the motor unit 320.

The first cylinder 332 and the second cylinder 334 are respectively provided with a first suction port 391 and a second suction port 393, which are respectively connected to a first suction pipe 390 and a second suction pipe 392 to allow the gaseous refrigerant to be introduced into the first compression space 350 and the second compression space 352. The first bearing plate 340 and the third bearing plate 344 are respectively provided with a first discharge port 394 and a second discharge port 395 to discharge the gaseous refrigerant compressed in the first compression space 350 and the second compression space 352 to the interior of the casing 310. Accordingly, when the compressor 300 is operated, the interior of the casing 310 is maintained at a high pressure by the compressed gaseous refrigerant discharged through the discharge ports 394 and 395. The compressed gaseous refrigerant in the casing 310 is discharged to an outer space through a discharge pipe 396 provided at the top of the casing 310.

The rotating shaft 321 penetrates the centers of the first compression space 350 and the second compression space 352, and is connected to the first rolling piston 360 and the second rolling piston 362 respectively provided in the first compression space 350 and the second compression space 352.

The first rolling piston 360 and the second rolling piston 362 may be coupled to the rotating shaft 321. More specifically, the first rolling piston 360 and the second rolling piston 362 may be coupled to the rotating shaft 321, with the centers thereof misaligned. Due to this configuration, the first rolling piston 360 and the second rolling piston 362 may eccentrically rotate within the compression spaces 350 and 352, compressing the gaseous refrigerant.

The vanes 371 and 381 include a first vane 371 provided to the first cylinder 332 and a second vane 381 provided to the second cylinder 334. The vanes 371 and 381 are arranged to respectively contact the outer circumferences of the rolling pistons 360 and 362 to divide each of the compression spaces 350 and 352 into the suction chamber 354 and the compression chamber 355.

The vane chambers 370 and 380 are formed to be recessed outward of the compression spaces 350 and 352. The vane chambers 370 and 380 include a first vane chamber 370 provided in the first cylinder 332 and a second vane chamber 380 provided in the second cylinder 334.

The first vane chamber 370 includes a first vane guide 372 to guide the first vane 371, which is configured to contact the first rolling piston 360, such that the first vane 371 moves forward and backward in conjunction with rotation of the first rolling piston 360, and a first vane spring accommodation portion 373 provided therein with a first vane spring 374 to press the first vane 371 against the first rolling piston 360 to allow the first vane 371 to sectionalize the first compression space 350.

In addition, the second vane chamber 380 includes a second vane guide 382 formed to be recessed outside of the second compression space 352 to guide the second vane 381, and a second vane spring accommodation portion 383 provided therein with a second vane spring 384 to press the second vane 381 against the second rolling piston 362 to allow the second vane 381 to sectionalize the second compression space 350.

A description of constituents of the compressor 300 has been given above. Hereinafter, operation of the compressor 300 will be described in connection with the first cylinder 332 as an example.

Figure 9:
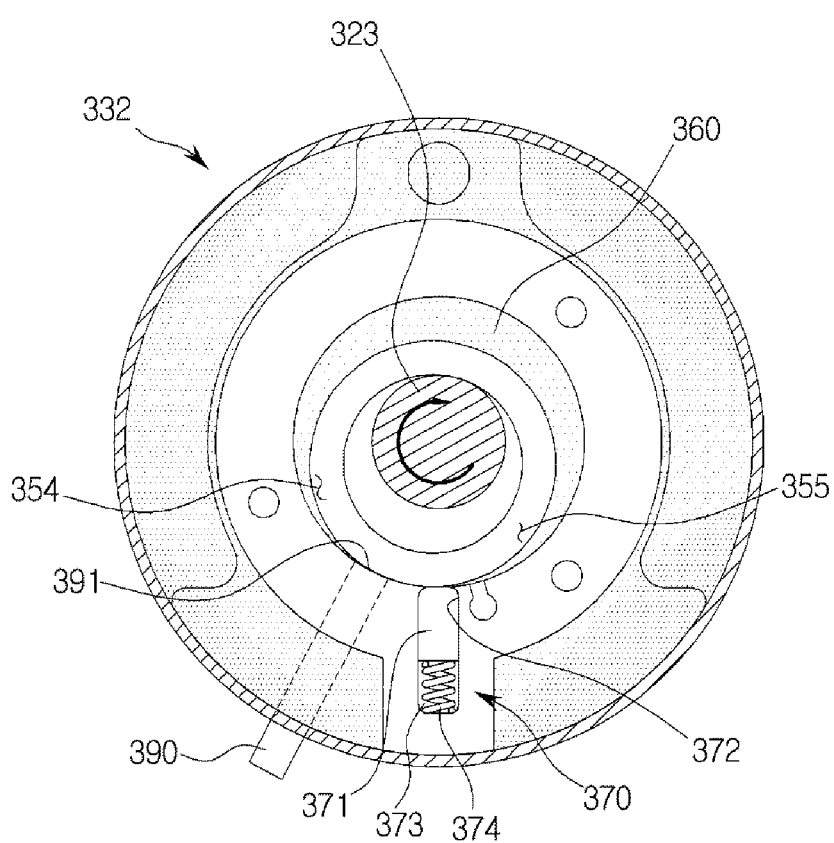
FIGS. 9 to 11 are views illustrating operation of a compressor included in an air conditioning apparatus according to one embodiment.
Figure 10:
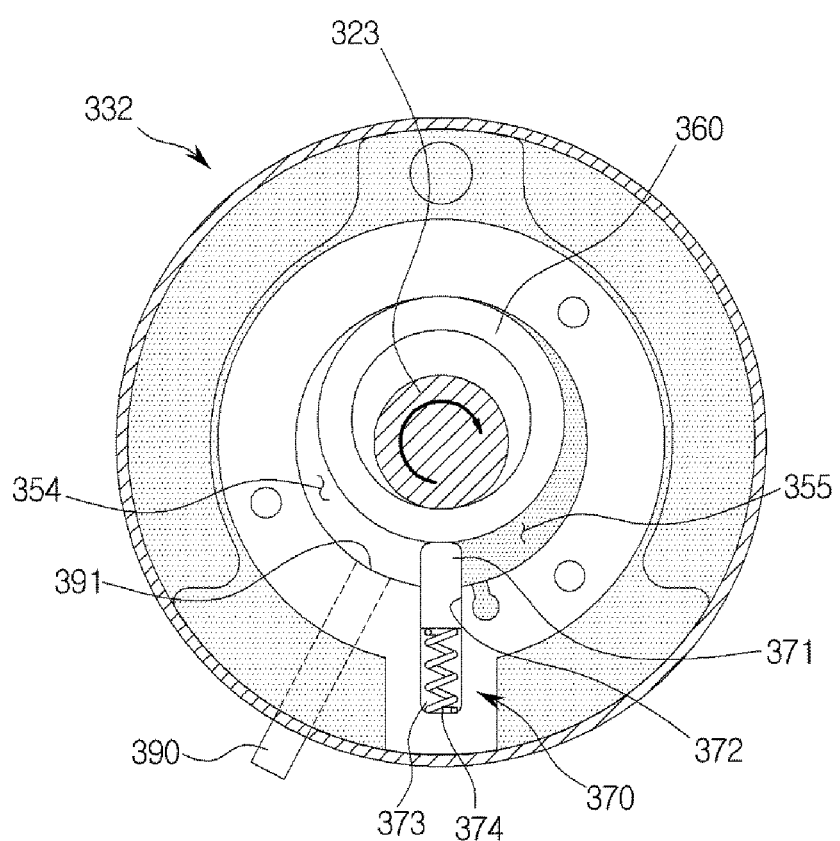
Figure 11:
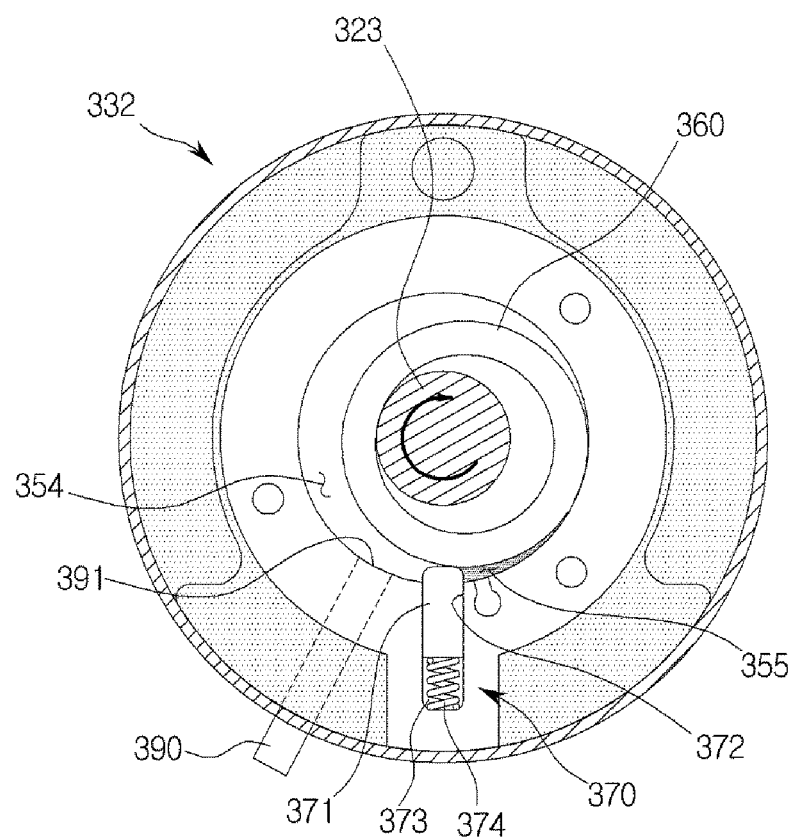

FIGS. 9 to 11 are views illustrating operation of a compressor included in an air conditioning apparatus according to one embodiment. Specifically FIGS. 9 to 11 schematically show a cross section of the first cylinder 332 shown in FIG. 8 to aid in understanding of operation of the compressor 300.

Referring to FIG. 9, a contact point P at which the outer circumferential surface of the first rolling piston 360 contacts the inner circumferential surface of the first cylinder 332 is positioned at the first suction port 391. The compression chamber 355 is defined by the outer circumferential surface of the first rolling piston 360, the inner circumferential surface of the first cylinder 332, and the right side surface of the first vane 371. The gaseous refrigerant suctioned by rotation of the rotating shaft 321 and the first rolling piston 360 fills the compression chamber 355.

When the rotating shaft 321 rotates counterclockwise, the contact point P at which the outer circumferential surface of the first rolling piston 360 contacts the inner circumferential surface of the first cylinder 332 rotates counterclockwise along the inner circumferential surface of the first cylinder 332, and the first vane 371 protrudes toward the rotating shaft 321 along the outer circumferential surface of the first rolling piston 360. Thereby, the space of the compression chamber 355 is gradually narrowed, and the gaseous refrigerant in the compression chamber 355 is compressed.

At the same time, the space of the suction chamber 354 defined by the outer circumferential surface of the first rolling piston 360, the inner circumferential surface of the first cylinder 332, and the left side surface of the first vane 371 is gradually widened. The gaseous refrigerant in the accumulator 125 is suctioned into the suction chamber 354 through the first suction port 391.

Referring to FIG. 10, which shows the point P of contact between the outer circumferential surface of the first rolling piston 360 and the inner circumferential surface of the first cylinder 332 having moved from the position shown in FIG. 9 to the opposite side facing the first vane 371 by rotation of the rotating shaft 321, the space of the compression chamber 355 decreases to about half the size of the space of the compression chamber 355 shown in FIG. 9. Thereby, the pressure of the gaseous refrigerant of the compression chamber 355 increases about two fold.

In addition, when the space of the compression chamber 355 is narrowed, the space of the suction chamber 354 is gradually widened, and the gaseous refrigerant in the accumulator 125 is continuously suctioned into the suction chamber 354 through the first suction port 391.

Referring to FIG. 11, which shows the point P of contact between the outer circumferential surface of the first rolling piston 360 and the inner circumferential surface of the first cylinder 332 having moved from the position shown in FIG. 10 to a position close to the first discharge port 394 by further rotation of the rotating shaft 321, the space of the compression chamber 355 is greatly reduced from the size of the space of the compression chamber 355 shown in FIG. 10. Thereby, the gaseous refrigerant in the compression chamber 355 is compressed to a very high pressure.

When the pressure of the gaseous refrigerant positioned in the compression chamber 355 becomes equal to or higher than a predetermined pressure, a pressure valve (not shown) maintaining the first discharge port 394 of the first cylinder 332 in a closed state is opened, and the high-pressure gaseous refrigerant in the compression chamber 355 is discharged to the refrigerant accommodation portion 311 of the compressor 300 through the first discharge port 394.

In addition, when the space of the compression chamber 355 is narrowed, the space of the suction chamber 354 is gradually widened, occupying most of the inner space of the first cylinder 332.

Thereafter, when the first rolling piston 360 is moved back to the position shown in FIG. 9 by further counterclockwise rotation of the rotating shaft 321, the space of the suction chamber 354 having suctioned the gaseous refrigerant changes to the space of the compression chamber 355 to compress the gaseous refrigerant. Thereby, the gaseous refrigerant in the new compression chamber 355 is compressed according to rotation of the rotating shaft 321.

Descriptions of constituents of an air conditioning apparatus and a structure of the compressor included in the air conditioning apparatus have been given above.

Hereinafter, a refrigerant included in an air conditioning apparatus will be described.

In a broad sense, the refrigerant represents all substances that exhibit a cooling effect, particularly, a fluid that is caused to circulate in a heat exchange cycle such as a refrigerating device, a heat pump, and an air conditioning apparatus to absorb heat from the surroundings through evaporation at a low-temperature side and release heat to the surroundings through condensation at a high-temperature side.

The refrigerant is generally one of four kinds of compounds, i.e., a halocarbon compound, a hydrocarbon compound, an organic compound, and an inorganic compound. Halocarbon compounds are widely used as refrigerants.

A halocarbon compound is a compound obtained by substituting a hydrogen atom of methane (CH4) or ethane (C2H6) with a halogen atom such as a fluorine atom, a chlorine atom, or a bromine atom. Herein, since the physical and chemical properties of a halocarbon compound sequentially change according to the kind and number of halogen atoms, a refrigerant suitable for working conditions may be properly selected.

Since the standard names of refrigerants are complicated and inconvenient to indicate the refrigerants, each refrigerant is represented by a symbol made by adding a number given according to a formula defined by the International Organization for Standardization (ISO) to "R," representing the word "refrigerant."

Figure 12:
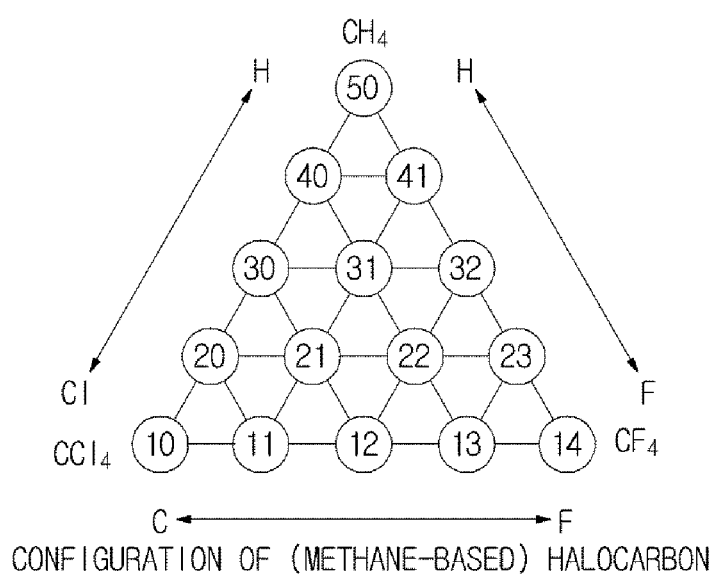
FIG. 12 is a view illustrating a refrigerant included in an air conditioning apparatus according to one embodiment.

FIG. 12 is a view illustrating a refrigerant included in an air conditioning apparatus according to one embodiment. Specifically, FIG. 12 systematically shows the configuration of a methane-based hydrocarbon refrigerant with methane (CH4), carbon tetrachloride (CCl4) and carbon tetrafluoride (CF4) positioned at vertices.

Referring to FIG. 12, as the hydrogen atoms contained in the methane (CH4, R50) are substituted by chlorine atoms, the refrigerant sequentially changes from R40 refrigerant (CH3C), to R30 refrigerant (CH2Cl2), to R20 refrigerant (CHCl3), and to R10 refrigerant (CCl4). As the number of chlorine atoms increases, the boiling point and critical point of the refrigerant also increase. In addition, as the chlorine atoms contained in the carbon tetrachloride (CCl4) are substituted by fluorine atoms, the refrigerant sequentially changes from R11 refrigerant (CCl3F), to R12 refrigerant (CCl2F2), to R13 refrigerant (CClF33), and to R14 refrigerant (CF4). As the number of fluorine atoms increases, the boiling point and critical point of the refrigerant also increase. In addition, as the hydrogen atoms contained in the methane (CH4, R50) are substituted by fluorine atoms, the refrigerant sequentially changes from R41 refrigerant (CH3F), to R32 refrigerant (CH2F2), to R23 refrigerant (CHF3), and to R14 refrigerant (CF4). The boiling point and critical point of R32 refrigerant are highest.

In addition, R50 refrigerant containing the greatest number of hydrogen atoms has the highest flammability. As the number of hydrogen atoms decreases, flammability of the refrigerant decreases. Regarding toxicity of the refrigerant, R10 refrigerant containing the greatest number of chlorine atoms has the highest toxicity. As the number of chlorine atoms decreases, toxicity of the refrigerant is lowered. Regarding stability of the refrigerants in the thermal decomposition process, R14 containing the greatest number of fluorine atoms has the highest stability. As the number of contained fluorine atoms decreases, stability decreases.

In addition, R10 refrigerant, R11 refrigerant, R12 refrigerant, R13 refrigerant, and R14 refrigerant, which do not contain any hydrogen atom, are fully halogenated refrigerants. These refrigerants are not easily decomposed in the atmosphere, thereby causing depletion of the ozone layer. That is, as the number of hydrogen atoms contained in the refrigerant decreases, the refrigerant is not easily decomposed in the atmosphere, causing depletion of the ozone layer.

In conventional cases, R12 refrigerant (CCl2F2, dichlorodifluoro-methane), a chlorofluorocarbon (CFC), also known as Freon gas, was widely used. However, since R12 refrigerant was identified as a primary cause of depletion of the ozone layer, R22 (CHClF2, chloro difluoro methane) refrigerant, a hydrochlorofluorocarbon (HCFC), began to be widely used, and use of R12 refrigerant was completely prohibited thereafter.

Thereafter, global warming potential (GWP), which has recently become a social issue, has formed the basis of refrigerant regulation in place of ozone depletion potential (ODP). Since R22 refrigerant, whose GWP is 2090, was identified as the cause of global warming, use of R22 refrigerant has begun to be regulated.

Accordingly, as an alternative substance to R22, a hydrofluorocarbon (HFC), R32 refrigerant (CH2F2, methylene fluoride), whose GWP is 675, is drawing attention. In addition to R32, R32 mixed refrigerant created by mixing R32 with R125 (CHF2CF3, pentafluoroethane) or R134a (CH2FCF3, tetrafluoroethane), which is an HFC, is also drawing attention.

Among double-mixed refrigerants containing R32 refrigerant, mention may be made of R410A, which is created by mixing R32 and R125 in a weight ratio of 50 to 50, and R410B, which is created by mixing R32 and R125 in a weight ratio of 45 to 55. Among double-mixed refrigerants containing R32, mention may be made of R407A, which is created by mixing R32, R123, and R134a in a weight ratio of 20:40:40, R407B, which is created by mixing R32, R123, and R134a in a weight ratio of 10:70:20, R407C, which is created by mixing R32, R123, and R134a in a weight ratio of 23:25:52, and R407D, which is created by mixing R32, R123, and R134a in a weight ratio of 15:15:70.

An R32 single refrigerant and R32-mixed refrigerants (hereinafter, R32 single refrigerant and R32-mixed refrigerants are all referred to as R32 refrigerant) have high boiling points and high critical point. In theory, the discharge temperature of the compressor using one of these refrigerants is 17.6° C. higher than in the case that R22 is used. According to actual evaluation, discharge temperature is 20° C. to 25° C. higher than in the case that R22 refrigerant is used. As a result, the temperature of the compressor rises, which may deteriorate the compressor. Specifically, in conventional cases, the compressor is manufactured using a material selected with reference to the Resistible Temperature of 120° C. (thermal class E). When R32 is used, the discharge temperature at which the refrigerant is discharged from the compressor exceeds 120° C., and therefore the conventional compressor may be deformed due to high temperature. Particularly, since the coating member to insulate the coil of a motor unit included in the compressor and the coil fixing member to fix the coil are formed of an insulative material such as plastics, they are vulnerable to heat.

Hereinafter, thermal resistance of the compressor will be described.

FIG. 13 is a view showing representative substances of respective thermal classes.

Referring to FIG. 13, the thermal classes are defined in Japanese Industrial Standards (JIS) to classify insulators according to Resistible Temperatures. More specifically, each class represents the highest allowable temperature for a coil fixing member. For example, an insulator from thermal class A should resist temperatures up to 105° C. That is, insulators from thermal class A are not deformed at at least 85° C. In addition, an insulator from thermal class E should resist temperatures up to 120° C., an insulator from thermal class B should resist temperatures up to 130° C., and an insulator from thermal class F should resist temperatures up to 155° C.

As shown in FIG. 13, substances belonging to thermal class F are inorganic materials such as mica, asbestos, and glass fiber. Adhesive materials from thermal class F include silicone alkyd resins.

In the case of a compressor included in an air conditioning apparatus using R32 as the refrigerant, an insulation material whose Resistible Temperature is equal to or greater than 140° C. may be employed. Particularly, as the insulation material, a material from thermal class F (Resistible Temperature 155° C.) may be used.

Referring to FIG. 6 showing a motor unit of a compressor, most parts of the compressor 300 are formed of a metallic material, while the coil 323*b* and the coil fixing member 323*a* provided in the motor unit 320 of the compressor 300 include an insulative material whose thermal resistance is determined according to the temperature at which the compressor 300 operates. Specifically, the coil 323*b* includes a conductive material such as copper which is electrically conductive and a coating member applied to the surface of the conductive material. The coating member is formed of an insulative material to insulate neighboring parts of the coil 323*b*. In addition, the coil fixing member 323*b* to fix the coil 323*b* is formed of an insulative material to insulate neighboring parts of the coil 323*a*. The thermal resistances of the coating member included in the coil 323*a* and the coil fixing member 323*b* to fix the coil 323*b* are determined according to the temperature at which the compressor 300 operates.

As described above, when R32 is used, the discharge temperature of the air conditioning apparatus 1 is 20° C. to 25° C. higher than when conventional R22 is used in the air conditioning apparatus 1. Accordingly, the coils 323*a* and the coil fixing member 323*b* of the compressor 300 included in the air conditioning apparatus 1 using R32 are formed of an insulation material whose Resistible Temperature is 140° C., particularly, an insulation material from thermal class F such that the compressor 300 is operable at at least 140° C. Specifically, the coating material applied to the surface of the coil 323*a* employs a coating material from thermal class F such as a silicone alkyd resin or a silicone resin, and the coil fixing member 323*b* to fix the coil 323*a* employs an inorganic material such as mica, asbestos, and glass fiber.

As substances from thermal class F are employed for the coating member of the coil 323*a* and the coil fixing member 323*b*, the coils 323*a* and the coil fixing member 323*b* of the motor unit 320 may not be deformed at the discharge temperature of R32, 140° C.

Hereinafter, a description will be given of a compressor oil of the compressor to reduce discharge temperature of a refrigerant.

Referring to FIG. 5 showing the lateral cross section of the compressor 300, the compressor 300 includes a refrigerant accommodation portion 311 to accommodate a high-pressure refrigerant in the casing 310, and a compressor oil accommodation portion 313 to accommodate compressor oil.

The compressor oil performs functions including lubrication of components of the compressor 300 to reduce friction between components, heat dissipation of absorbing heat produced in the compressor 300 and releasing the heat to the outer space, and sealing the compressor 300 to prevent leakage of the refrigerant. Compressor oils are classified into mineral oil, which is produced by adding an additive to crude oil having undergone a refining process, and synthetic oil, which is synthesized from naphtha to have a proper chemical structure. The replacement period of mineral oil is about 1,000 hours, while the replacement period of synthetic oil is 4,000 hours, which is significantly longer than the replacement period of mineral oil.

The compressor oil is stored in the compressor oil accommodation portion 313, and is introduced into the compression unit 330 through the compressor oil introduction port 313a provided at the lower portion of the compression unit 330. The compressor oil introduced into the compression unit 330 lowers friction between the rotating shaft 321 of the motor unit 320 and the bearing plates 340, 342 and 344 of the compression unit 330 such that the rotating shaft 321 of the motor unit 320 rotates smoothly. In addition, the compressor oil lowers friction between the cylinders 332 and 334 and the rolling pistons 360 and 362 such that the rolling pistons 360 and 362 smoothly rotate in the cylinders 332 and 334.

In addition, when the refrigerant is compressed, the compressor oil prevents the high-pressure refrigerant positioned in the compression chamber 355 from being introduced into the suction chamber 354. That is, the compressor oil seals a fine gap between the rolling pistons 360 and 362 and the vanes 371 and 381, thereby preventing the high-pressure refrigerant in the compression chamber 355 from being introduced into the suction chamber 354 of low pressure through the gap between the rolling pistons 360 and 362 and the vanes 371 and 381.

To perform lubrication and prevent refrigerant leakage, the compressor oil is positioned in the cylinders 332 and 334. When the refrigerant is discharged from the compression unit 330 to the refrigerant accommodation portion 311, the compressor oil positioned in the cylinders 332 and 334 is also discharged from the compression unit 330 to the refrigerant accommodation portion 313. In addition, when the compressor oil and the refrigerant are discharged to the refrigerant accommodation portion 313, the compressor oil absorbs heat from the refrigerant, lowering the discharge temperature of the refrigerant. In other words, the compressor oil may lower the operational temperature of the compressor 300.

To properly perform the function of heat dissipation, change in temperature of the compressor oil should be small even if the compressor oil absorbs a large amount of heat from the refrigerant. That is, compressor oil having a high heat capacity performs excellent heat dissipation.

Herein, heat capacity is the quantity that specifies the amount of heat required to increase the temperature of an object by 1° C. (K). The heat capacity of an object is given by Equation 1.

$$C = \frac{Q}{\Delta t} \quad \text{[Equation 1]}$$

(C is the heat capacity, Q is the amount of heat, and $\Delta t$ is change in temperature.)

According to Equation 1, the heat capacity of an object is proportional to the amount of heat applied and inversely proportional to change in temperature. That is, when the same amount of heat is applied, an object exhibiting a small change in temperature has a high heat capacity, and an object exhibiting a large change in temperature has a low heat capacity.

The heat capacity of an object is proportional to the mass and specific heat thereof. That is, the relation between heat capacity, mass and specific heat of an object is given as Equation 2.

$$C = c \times m \quad \text{[Equation 2]}$$

(C is the heat capacity of the object, c is the specific heat of the object, and m is the mass of the object.)

According to Equation 2, the heat capacity may be increased by increasing the specific heat or the mass of the object.

A description will be first given of the case of increasing the specific heat to increase the heat capacity of the compressor oil.

The specific heat of a substance is a ratio of the amount of heat required to increase the temperature of the unit mass (1 kg) of a substance by 1° C. (K) to the amount of heat required to increase the temperature of the unit mass (1 kg) of water by 1° C. (K). Specific heat of a substance may be defined using Equation 3.

$$C = \frac{Q}{m\Delta t} \quad \text{[Equation 3]}$$

(C is heat capacity, Q is the amount of heat, m is mass, and $\Delta t$ is change in temperature.)

Specific heat is a unique property of a substance. Different substances have different specific heats. Accordingly, for the compressor oil to absorb a large amount of heat from the compressor 300 with a small change in temperature, a substance of a high specific heat may need to be employed as the compressor oil. That is, a different substance may need to be employed as the compressor oil.

Next, a description will be given of the case of increasing the mass to increase the heat capacity of the compressor oil.

Figure 14:
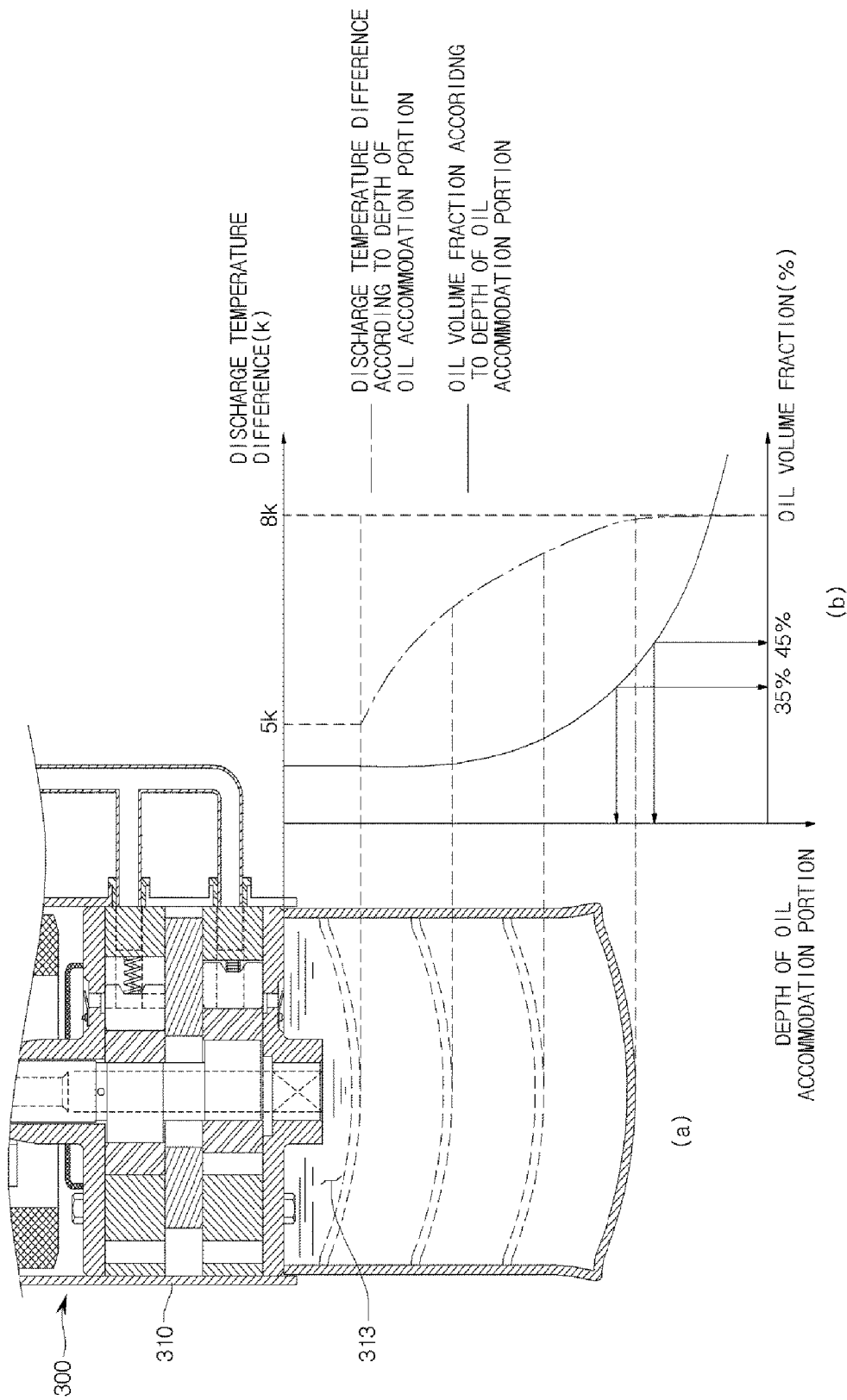
FIG. 14 is a view illustrating a compressor oil accommodation portion of a compressor included in an air conditioning apparatus according to one embodiment.

FIG. 14 is a view illustrating a compressor oil accommodation portion of a compressor included in an air conditioning apparatus according to one embodiment.

Referring to FIG. 14, part (a) illustrates the case of increasing the size of the compressor oil accommodation portion 313 included in the compressor 300 to accommodate a large amount of the compressor oil, the compressor oil accommodation portion 313 is formed deep to allow the compressor 300 to accommodate a large amount of compressor oil. That is, by increasing the depth of the compressor oil accommodation portion 313 while keeping the depth of the other portions of the compressor 300 constant, the amount of the compressor oil accommodated in the compressor 300 may be increased.

Hereinafter, the compressor oil volume fraction and discharge temperature difference according to the size of the compressor oil accommodation portion 313 will be described with reference to FIG. 14, part (b).

In FIG. 14, part (b), the vertical axis represents the depth of the compressor oil accommodation portion 313. As the compressor oil accommodation portion 313 is positioned further downward along the vertical axis, the depth of the compressor oil accommodation portion 313 increases. Thereby, the compressor 300 may accommodate a larger amount of the compressor oil.

In FIG. 14, part (b), the lower horizontal axis represents the compressor oil volume fraction. The compressor oil volume fraction is defined by Equation 4.

$$\text{Oil volume fraction} = \frac{\text{Compressor of volume}}{\text{Effective volume of the interior of the compressor}} \quad \text{[Equation 4]}$$

Herein, the compressor oil volume represents the volume of the compressor oil, i.e., the volume of the compressor oil accommodation portion 313, and the effective volume of the interior of the compressor represents the volume of the compressor 300 excluding the volume of the motor unit 320 and the compression unit 330, i.e., the volume of the empty space in the compressor 300.

Referring to FIG. 14, part (b), the solid line represents the compressor oil volume fraction according to the depth of the compressor oil accommodation portion 313. As the depth of the compressor oil accommodation portion 313 increases, the compressor oil volume fraction exponentially increases. In other words, as the depth of the compressor oil accommodation portion 313 increases, the rate of increase of the compressor oil volume fraction increases.

In FIG. 14, part (b), the upper horizontal axis represents discharge temperature difference. The discharge temperature difference is the difference in temperature between the refrigerant discharged through the discharge ports 394 and 395 (see FIG. 5) of the cylinders 332 and 334 (see FIG. 5) included in the compressor 300 and the refrigerant discharged from the discharge pipe 396 (see FIG. 5) of the compressor 300.

A large discharge temperature difference suggests that the high-temperature, high-pressure refrigerant discharged from the cylinders 332 and 334 (see FIG. 5) has been cooled in the refrigerant accommodation portion 311 (see FIG. 5) and discharged to the discharge pipe 396 (see FIG. 5) of the compressor 300. In other words, it suggests that the temperature of the compressor 300 has been lowered.

In FIG. 14, part (b), the dotted line represents change of the discharge temperature difference according to depth of the compressor oil accommodation portion 313. Referring to this dotted line, as the depth of the compressor oil accommodation portion 313 increases, the discharge temperature difference increases logarithmically. In other words, as the depth of the compressor oil accommodation portion 313 increases, the rate of increase of the discharge temperature difference is lowered.

Moreover, after the discharge temperature difference reaches a certain level, it does not increase any more, but remains saturated. According to the graph shown in FIG. 14, part (b), after the discharge temperature difference reaches 8° C. (K), it does not increase any more, but remains saturated.

The compressor oil volume fraction at which the discharge temperature difference is saturated and thus not increased any more, is 35% to 45%. In other words, after the compressor oil volume fraction becomes 35% to 45%, the operational temperature of the compressor 300 is not lowered any more, or change in the operational temperature of the compressor 300 is negligible.

Consequently, a proper discharge temperature of the refrigerant may be obtained when the size of the compressor oil accommodation portion 313 is set such that the compressor oil volume fraction is 35% to 45%.

A description of lowering the discharge temperature of the refrigerant, i.e., the operational temperature of the compressor by increasing the heat capacity of the compressor oil has been given above.

Hereinafter, a description will be given of lowering the discharge temperature of the refrigerant discharged from the cylinder by lowering the temperature inside the cylinder.

Increase in the discharge temperature of the refrigerant discharged from the cylinder is mainly caused by two events.

That is, the temperature of the refrigerant is increased by increase in collision among refrigerant particles and transfer of frictional heat of the compressor to the refrigerant, which occur during compression of the refrigerant.

First, increase in the temperature of the refrigerant by increase in collision among refrigerant particles during compression of the refrigerant is related to physical properties of the refrigerant, and may be addressed by employing a different kind of refrigerant.

Second, increase in the temperature of the refrigerant by transfer of frictional heat of the compressor to the refrigerant occurring during compression of the refrigerant may be addressed by reducing the frictional heat of the compressor. Specifically, the frictional heat may be reduced by enhancing the lubrication function of the compressor oil.

The compressor oil included in the compressor of an air conditioning apparatus according to one embodiment includes carbon nanoparticles. Specifically, the compressor oil includes nanoparticles whose size is between about 3 nm and 10 nm such that the weight ratio of the carbon nanoparticles becomes between about 0.01 wt. % and about 0.3 wt. %.

The carbon nanoparticles represent carbon particles whose size ranges from a few nanometers (a nanometer is one billionth of a meter) to a few hundred nanometers. A representative type of carbon nanoparticles is a fullerene, which has a spherical or ellipsoidal shape.

Fullerene refers to any carbon particles at nanometer scale including C60 having the form of a soccer ball through covalent bonding of 60 carbon atoms, C70 in the form of an ellipsoid, C76, C78, C82, C90, C94 and C96. Among fullerenes, C60 is produced through covalent boding of 60 carbon atoms, and contains 12 five-member rings and 20 six-member rings. C60, whose diameter is about 1 nm, is a representative carbon nanoparticle.

Fullerenes are stronger than diamond and are slippery. Due to strong covalent bonding of carbon atoms, fullerenes have low reactivity and are nontoxic to humans. In addition, fullerenes absorb light and easily acquire an electron.

By adding carbon nanoparticles, represented by fullerenes, to the compressor oil, the lubrication function of the compressor oil may be enhanced. Specifically, carbon nanoparticles are inert substances that do not react to the compressor oil at high temperature. In addition, the carbon nanoparticle has a spherical shape. Accordingly, it does not stick to the surfaces of objects subjected to lubrication, but rolls on the surfaces, greatly reducing friction between objects.

FIG. 15 is an enlarged view showing region B of FIG. 5. Specifically, FIG. 15 is a view illustrating contact between the bearing plates 340, 342 and 344 of the compression unit 330 and the rotating shaft 321 of the motor unit 320 inserted into the bearing plates 340, 342 and 344.

Referring to FIGS. 5 and 15, the rotating shaft 321 inserted into the bearing plates 340, 342 and 344 contacts and is fixed by the bearing plates 340, 342 and 344. In addition, when the rotating shaft 321 rotates, friction is produced between the outer circumferential surface of the rotating shaft 321 and the inner circumferential surfaces of the bearing plates 340, 342 and 344.

When the rotating shaft 321 rotates with the outer circumferential surface thereof contacting the bearing plates 340, 342 and 344, the spherical carbon nanoparticles function as bearings in rolling contact with the outer circumferential surface of the rotating shaft 321 and the inner circumferential surfaces of the bearing plates 340, 342 and 344, thereby reducing friction between the rotating shaft 321 and the bearing plates 340, 342 and 344.

In addition, the carbon nanoparticles fill a spike-shaped crevice which may be produced on the outer circumferential surface of the rotating shaft 321 and the inner circumferential surfaces of the bearing plates 340, 342 and 344, reducing friction.

Even when friction between the rotating shaft 321 and the bearing plates 340, 342 and 344 is reduced by the carbon nanoparticles functioning as rolling contact bearings, a spike-shaped crevice may be produced on the outer circumferential surface of the rotating shaft 321 and the inner circumferential surfaces of the bearing plates 340, 342 and 344 by external force forcing the rotating shaft 321 to contact the bearing plates 340, 342 and 344, as shown in FIG. 15, part (a). This spike-shaped crevice increases friction between the rotating shaft 321 and the bearing plates 340, 342 and 344.

In conventional cases, the compressor oil is simply applied to the outer circumferential surface of the rotating shaft 321 and the inner circumferential surfaces of the bearing plates 340, 342 and 344 to form a certain thickness, as shown in FIG. 15, part (b). Accordingly, friction between the rotating shaft 321 and the bearing plates 340, 342 and 344 resulting from the spike-shaped crevice may not be reduced.

In the case that carbon nanoparticles are added to the compressor oil, however, the carbon nanoparticles contained in the compressor oil fill the spike-shaped crevice formed on the outer circumferential surface of the rotating shaft 321 and the inner circumferential surfaces of the bearing plates 340, 342 and 344, as shown in FIG. 15, part (c), thereby reducing friction between the rotating shaft 321 and the bearing plates 340, 342 and 344 caused by the spike-shaped crevice.

As such, the compressor oil containing carbon nanoparticles reduces friction between the rotating shaft 321 and the bearing plates 340, 342 and 344, thereby reducing frictional heat. By reducing frictional heat produced between the rotating shaft 321 and the bearing plates 340, 342 and 344, the temperature in the cylinders 350 and 352 is lowered and the discharge temperature of the refrigerant discharged from the cylinders 350 and 352 is also reduced.

As described above, in the case of a compressor using R32, reliability and performance of the compressor may be secured at high operational temperature of the compressor by using an insulation material from thermal F class for the coils and coil fixing member included in the motor unit of the compressor.

In addition, by increasing the capacity of the compressor oil accommodation portion to accommodate the compressor oil, the heat capacity of the compressor oil may be increased. Further, by adding carbon nanoparticles to the compressor oil, friction between components included in the compressor may be reduced, and the operational temperature of the compressor may be lowered. Thereby, reliability and performance of the compressor may be secured.

As is apparent from the above description, according to one aspect of the present disclosure, even when an HFC-based refrigerant producing high discharge temperature in a compressor is used, deterioration of the compressor due to the high temperature is prevented. In addition, by lowering the operational temperature of the compressor, the reliability and performance of the compressor using the HFC-based refrigerant and an air conditioning apparatus using the same may be enhanced.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An air conditioning apparatus comprising:
   a compressor to compress a refrigerant;
   an outdoor heat exchanger to perform heat exchange between outdoor air and the refrigerant;
   an indoor heat exchanger to perform heat exchange between indoor air and the refrigerant; and
   an expansion valve to depressurize the refrigerant,
   wherein the refrigerant includes methylene fluoride, the weight percentage of the methylene fluoride being at least 40%;
   the compressor comprises a compression unit to compress the refrigerant, a motor unit to provide rotational power to the compression unit through a rotating shaft connected to the compression unit, and an oil accommodation portion to store oil to reduce friction between the rotating shaft and the compression unit and lower a temperature of the compressor, the oil containing a carbon nanoparticle;
   a compressor oil fraction is 35% to 45%, where the compressor oil fraction is a compressor oil volume divided by an effective volume of an interior of the compressor; and
   the effective volume represents a volume obtained by subtracting volumes of the motor unit and the compressor unit from an entire volume of the compressor.

2. The air conditioning apparatus according to claim 1, wherein the refrigerant further comprises at least one of penta-fluoro ethane and tetra-fluoro ethane.

3. The air conditioning apparatus according to claim 1, wherein
   a mass fraction of the carbon nanoparticle contained in the oil is about 0.01% to about 0.3% of a mass of the oil.

4. The air conditioning apparatus according to claim 3, wherein a size of the carbon nanoparticle contained in the oil is between about 3 nanometers and 10 nanometers.

5. The air conditioning apparatus according to claim 4, wherein the carbon nanoparticle comprises a fullerene formed in a spherical or ellipsoidal shape.

6. The air conditioning apparatus according to claim 5, wherein the fullerene comprises C60 provided with a spherical shape by covalent bonding of sixty carbon atoms.

7. The air conditioning apparatus according to claim 1, wherein a temperature of the refrigerant discharged from the compressor is 8° C. lower than a temperature of the refrigerant discharged from the compression unit.

8. The air conditioning apparatus according to claim 1, wherein the motor unit comprises a stator fixed to an interior of the compressor, and a rotator connected to the rotating shaft and rotatably arranged in the stator, wherein the stator comprises a coil to produce a rotating magnetic field, and a coil fixing member to fix the coil.

9. The air conditioning apparatus according to claim 8, wherein an insulation member to insulate the coil is formed of an insulative material having a Resistible Temperature of 140° C.

10. The air conditioning apparatus according to claim 9, wherein the insulation member is a silicone alkyd resin or a silicone resin.

11. The air conditioning apparatus according to claim 8, wherein the coil fixing member is formed of a material from thermal class F allowing temperature up to 155° C.

12. The air conditioning apparatus according to claim 11, wherein the coil fixing member is formed of at least of mica, asbestos, and glass fiber.

13. The air conditioning apparatus according to claim 1, wherein the compressor further comprises a refrigerant accommodation portion to store the refrigerant discharged from the compression unit.

14. The air conditioning apparatus according to claim 13, wherein the compression unit comprises:
a cylinder to define a compression space to compress the refrigerant;
a rolling piston connected to the rotating shaft to eccentrically rotate in the cylinder; and
a vane protruding from an inner circumferential surface of the cylinder toward the rotating shaft to divide the compression space into a compression chamber for compression of the refrigerant and a suction chamber for suction of the refrigerant.

15. The air conditioning apparatus according to claim 14, wherein the rolling piston compresses the refrigerant in the compression chamber by eccentrically rotating with respect to the rotating shaft.

16. The air conditioning apparatus according to claim 15, wherein the compression unit discharges the refrigerant in the compression chamber to the refrigerant accommodation portion when a pressure of the refrigerant in the compression chamber is equal to or greater than a predetermined pressure.

17. The air conditioning apparatus according to claim 16, wherein the compression unit further comprises a plurality of bearing plates to fix the rotating shaft and to cover upper and lower portions of the cylinder to seal the compression space.

18. A compressor comprising:
a compression unit to compress a refrigerant;
a motor unit to provide rotational power to the compression unit through a rotating shaft connected to the compression unit; and
an oil accommodation portion to store oil to reduce friction between the rotating shaft and the compression unit and lower a temperature of the compressor, the oil containing a carbon nanoparticle,
wherein the compression unit comprises a cylinder to define a compression space to compress the refrigerant, a rolling piston connected to the rotating shaft to eccentrically rotate in the cylinder, and a vane protruding from an inner circumferential surface of the cylinder toward the rotating shaft to divide the compression space into a compression chamber for compression of the refrigerant and a suction chamber for suction of the refrigerant;
the refrigerant includes methylene fluoride, the weight percentage of the methylene fluoride being at least 40%;
a compressor oil fraction is 35% to 45%, where the compressor oil fraction is a compressor oil volume divided by an effective volume of an interior of the compressor; and
the effective volume represents a volume obtained by subtracting volumes of the motor unit and the compressor unit from an entire volume of the compressor.

19. The compressor according to claim 18, wherein the refrigerant further comprises at least one of penta-fluoro ethane and tetra-fluoro ethane.

20. The compressor according to claim 18, wherein a mass fraction of the carbon nanoparticle contained in the oil is about 0.01% to about 0.3% of a mass of the oil.

21. The compressor according to claim 20, wherein a size of the carbon nanoparticle contained in the oil is between about 3 nanometers and 10 nanometers.

22. The compressor according to claim 21, wherein the carbon nanoparticle comprises a fullerene formed in a spherical or ellipsoidal shape.

23. The compressor according to claim 22, wherein the fullerene comprises C60 provided with a spherical shape by covalent bonding of sixty carbon atoms.

24. The compressor according to claim 18, wherein a temperature of the refrigerant discharged from the compressor is 8° C. lower than a temperature of the refrigerant discharged from the compression unit.

25. The compressor according to claim 18, wherein the motor unit comprises a stator fixed to an interior of the compressor, and a rotator connected to the rotating shaft and rotatably arranged in the stator, wherein the stator comprises a coil to produce a rotating magnetic field, and a coil fixing member to fix the coil.

26. The compressor according to claim 25, wherein an insulation member to insulate the coil is formed of an insulative material having a Resistible Temperature of 140° C.

27. The compressor according to claim 26, wherein the insulation member is a silicone alkyd resin or a silicone resin.

28. The compressor according to claim 25, wherein the coil fixing member is formed of a material from thermal class F allowing a temperature up to 155° C.

29. The compressor according to claim 28, wherein the coil fixing member is formed of at least one of mica, asbestos, and glass fiber.

* * * * *